(12) United States Patent
Choi et al.

(10) Patent No.: US 11,120,630 B2
(45) Date of Patent: Sep. 14, 2021

(54) VIRTUAL ENVIRONMENT FOR SHARING INFORMATION

(71) Applicant: SAMSUNG ELECTRONICS CO., LTD., Suwon-si (KR)

(72) Inventors: Woosung Choi, Yongin-si (KR); Hyuk Kang, Yongin-si (KR); Minji Kim, Seongnam-si (KR); Dongil Son, Hwaseong-si (KR); Buseop Jung, Suwon-si (KR); Jongho Choi, Suwon-si (KR); Jooman Han, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/536,195

(22) Filed: Aug. 8, 2019

(65) Prior Publication Data

US 2019/0362560 A1 Nov. 28, 2019

Related U.S. Application Data

(63) Continuation of application No. 14/934,587, filed on Nov. 6, 2015, now abandoned.

(30) Foreign Application Priority Data

Nov. 7, 2014 (KR) ........................ 10-2014-0154367

(51) Int. Cl.
*G06T 19/00* (2011.01)
*G06F 3/01* (2006.01)

(52) U.S. Cl.
CPC ............ *G06T 19/006* (2013.01); *G06F 3/011* (2013.01); *G09G 2354/00* (2013.01); *G09G 2370/12* (2013.01); *G09G 2380/10* (2013.01)

(58) Field of Classification Search
CPC ........ G06T 19/006; G06T 11/60; G06F 3/011; G09G 2354/00; G09G 2380/10; G09G 2370/12; G09G 2380/12; G09G 5/377
See application file for complete search history.

(56) References Cited

U.S. PATENT DOCUMENTS

| 8,427,396 B1 | 4/2013 | Kim |
| 8,605,008 B1 | 12/2013 | Prest et al. |

(Continued)

FOREIGN PATENT DOCUMENTS

| CN | 102542921 | 7/2012 |
| CN | 102628991 | 8/2012 |

(Continued)

OTHER PUBLICATIONS

European Extended Search Report dated Jan. 15, 2016 in counterpart European Application No. 15193546.7.

(Continued)

*Primary Examiner* — Chante E Harrison
(74) *Attorney, Agent, or Firm* — Nixon & Vanderhye, P.C.

(57) ABSTRACT

An electronic device providing information through a virtual environment is disclosed. The device includes: a display; and an information providing module functionally connected with the display, wherein the information providing module displays an object corresponding to an external electronic device for the electronic device through the display, obtains information to be output through the external electronic device, and provides contents corresponding to the information in relation to a region, on which the object is displayed.

20 Claims, 12 Drawing Sheets

(56) References Cited

U.S. PATENT DOCUMENTS

| | | |
|---|---|---|
| 9,836,987 B2 | 12/2017 | Postlethwaite |
| 2007/0132662 A1 | 6/2007 | Morita |
| 2011/0037712 A1 | 2/2011 | Kim |
| 2011/0170787 A1 | 7/2011 | Gum |
| 2012/0200478 A1 | 8/2012 | Kobayashi |
| 2012/0249591 A1 | 10/2012 | Maciocci et al. |
| 2013/0002701 A1 | 1/2013 | Ida |
| 2013/0050432 A1 | 2/2013 | Perez et al. |
| 2013/0069985 A1 | 3/2013 | Wong et al. |
| 2013/0147686 A1 | 6/2013 | Clavin et al. |
| 2013/0187835 A1 | 7/2013 | Vauqht |
| 2013/0194164 A1 | 8/2013 | Sugden |
| 2013/0222672 A1 | 8/2013 | Kim |
| 2013/0257690 A1* | 10/2013 | Fujimaki ............ G02B 27/017 345/8 |
| 2014/0015736 A1 | 1/2014 | Kim |
| 2014/0028921 A1* | 1/2014 | Moon ............ H04N 5/44582 348/734 |
| 2014/0062854 A1 | 3/2014 | Cho |
| 2014/0192085 A1 | 7/2014 | Kim |
| 2014/0267012 A1 | 9/2014 | Mullins |
| 2015/0052479 A1 | 2/2015 | Ooi et al. |
| 2015/0332620 A1 | 11/2015 | Sako |
| 2015/0346816 A1 | 12/2015 | Lee |
| 2016/0026253 A1* | 1/2016 | Bradski ............ H04N 13/344 345/8 |
| 2016/0116979 A1* | 4/2016 | Border ................ G06F 3/013 345/156 |
| 2016/0124579 A1 | 5/2016 | Tokutake |
| 2016/0133052 A1 | 5/2016 | Choi et al. |
| 2016/0292922 A1* | 10/2016 | Kasahara ............ G06F 1/1647 |
| 2016/0328021 A1 | 11/2016 | Lee |
| 2016/0371886 A1* | 12/2016 | Thompson ........ G02B 27/0172 |
| 2017/0185276 A1 | 6/2017 | Lee |
| 2017/0295278 A1 | 10/2017 | Lyren |
| 2018/0005439 A1* | 1/2018 | Evans ................ G06Q 90/00 |
| 2018/0136715 A1* | 5/2018 | Kim .................... G06F 3/011 |
| 2018/0204385 A1* | 7/2018 | Sarangdhar .......... G06F 3/011 |
| 2018/0329662 A1* | 11/2018 | Cronin ................ G06F 3/147 |
| 2019/0122439 A1* | 4/2019 | Thiebaud ............ G06T 15/503 |
| 2019/0129607 A1* | 5/2019 | Saurabh ............ G06F 3/04847 |

FOREIGN PATENT DOCUMENTS

| | | |
|---|---|---|
| CN | 103091844 | 5/2013 |
| CN | 103377487 | 10/2013 |
| CN | 103946734 | 7/2014 |
| JP | 2014-515854 | 7/2014 |
| WO | 2012/135553 | 10/2012 |

OTHER PUBLICATIONS

First Office Action dated Jan. 22, 2020 in counterpart Chinese Patent Application No. CN201510757641 and English-language translation of same.

Decision of Patent dated Apr. 27, 2021 in counterpad Korean Patent Application No. 10-2014-0154367 and English-language translation of same.

\* cited by examiner

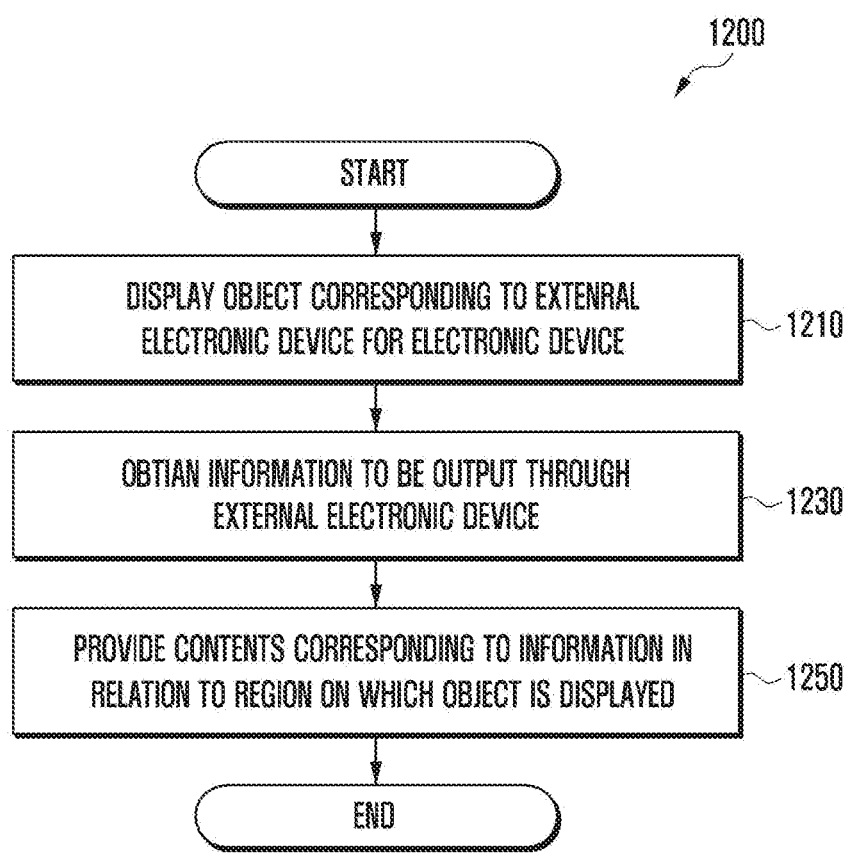

VIRTUAL ENVIRONMENT FOR SHARING INFORMATION

CROSS-REFERENCE TO RELATED APPLICATIONS

This application is a continuation of U.S. application Ser. No. 14/934,587, filed on Nov. 6, 2015, which claims priority under 35 U.S.C. § 119 to Korean Patent Application No. 10-2014-0154367, filed Nov. 7, 2014. The contents of each of these applications are incorporated herein in their entirety.

BACKGROUND

1. Field

The disclosure relates to an electronic device, and for example, to an apparatus and a method for sharing information through a virtual environment.

2. Description of Prior Art

Recently, electronic devices have been developed into various forms, such as a portable device (for example, a smart phone and a tablet PC) or a wearable device (for example, a smart watch and a head-mounted device)), as well as a smart home appliance (for example, a smart television and a game console). The electronic devices having various forms may exchange information. For example, a smart television, a smart phone, and a notebook computer may be connected with each other through a network. The smart phone may transmit a picture stored in a smart phone to a smart television. In this case, a user of the smart television may check the picture stored in the smart phone through the smart television. Further, a notebook computer may transmit a movie to the smart television. In this case, the user of the smart television may watch the movie, instead of the picture, through the smart television.

According to the related art, an electronic device may provide a user with contents obtained from an external electronic device. In this case, the electronic device may provide the contents without discriminating the contents from other previously obtained contents. Accordingly, it may be difficult for a user to discriminate the contents obtained from the external electronic device from other contents. For example, it is difficult for a user to recognize information about a device, from which the contents are obtained.

When the electronic device obtains a plurality of contents from a plurality of external electronic devices, respectively, the electronic device may not simultaneously provide the user with the plurality of contents in the related art. Accordingly, the user is inconvenienced by needing to first check one of the plurality of contents, and then check other contents.

The electronic device may provide a user with various virtual environments so that the user may view a 2D or 3D image. For example, the electronic device may provide a user with a new environment regardless of a space, in which a user is actually located. Accordingly, the user may more vividly view the 2D or 3D image based on a virtual environment.

However, the electronic device in the related art cannot reflect a space, in which a user is actually located, to a virtual environment. For example, since the electronic device is capable of using only a set image, the electronic device cannot represent various electronic devices (for example, a television, a refrigerator, or a computer) located in an actual space on a virtual environment. Accordingly, when a user uses a virtual environment, the user may not directly control an electronic device located in an actual space.

SUMMARY

An example of the disclosure provides an electronic device and a method capable of relating contents obtained from an external electronic device to an object corresponding to the external electronic device through a virtual environment and providing the obtained contents. Accordingly, the electronic device may discriminate the contents obtained from the external electronic device from other contents and provide the obtained contents through the virtual environment.

Another example of the disclosure provides an electronic device and a method capable of relating contents obtained from a plurality of external electronic devices to a plurality of objects corresponding to the plurality of external electronic devices, respectively, and simultaneously providing the obtained contents.

Another example of the disclosure provides an electronic device and a method capable of enabling a user to directly control electronic devices disposed in an actual space through a virtual environment by reflecting a space, in which the user is actually located, to the virtual environment.

In accordance with an example of the disclosure, an electronic device is provided. The electronic device includes: a display; and an information providing module in the form of processing circuitry functionally connected with the display, wherein the information providing module is configured to display an object corresponding to an external electronic device for the electronic device through the display, to obtain information to be output through the external electronic device, and to provide contents corresponding to the information in relation to a region, on which the object is displayed.

The electronic device and the method according to various examples may provide, for example, contents obtained from an external electronic device to a user in relation to an object corresponding to the external electronic device, thereby enabling the user to discriminate the contents obtained from the external electronic device from other contents based on the object.

The electronic device and the method according to various examples may simultaneously provide, for example, a plurality of contents obtained from a plurality of external electronic devices through a plurality of objects corresponding to the plurality of external electronic devices, respectively, thereby reducing or overcoming inconvenience caused when a user needs to check each of the plurality of contents.

The electronic device and the method according to various examples may provide, for example, contents obtained through an external electronic device through a virtual environment, thereby providing a service linked with the external electronic device through the virtual environment.

BRIEF DESCRIPTION OF THE DRAWINGS

The above and other objects, features and advantages of the disclosure will be more apparent from the following detailed description taken in conjunction with the accompanying drawings, in which like reference numerals refer to like elements, and wherein:

FIG. 12 is a flowchart illustrating an example method for providing information by an electronic device.

DETAILED DESCRIPTION

Figure 1:
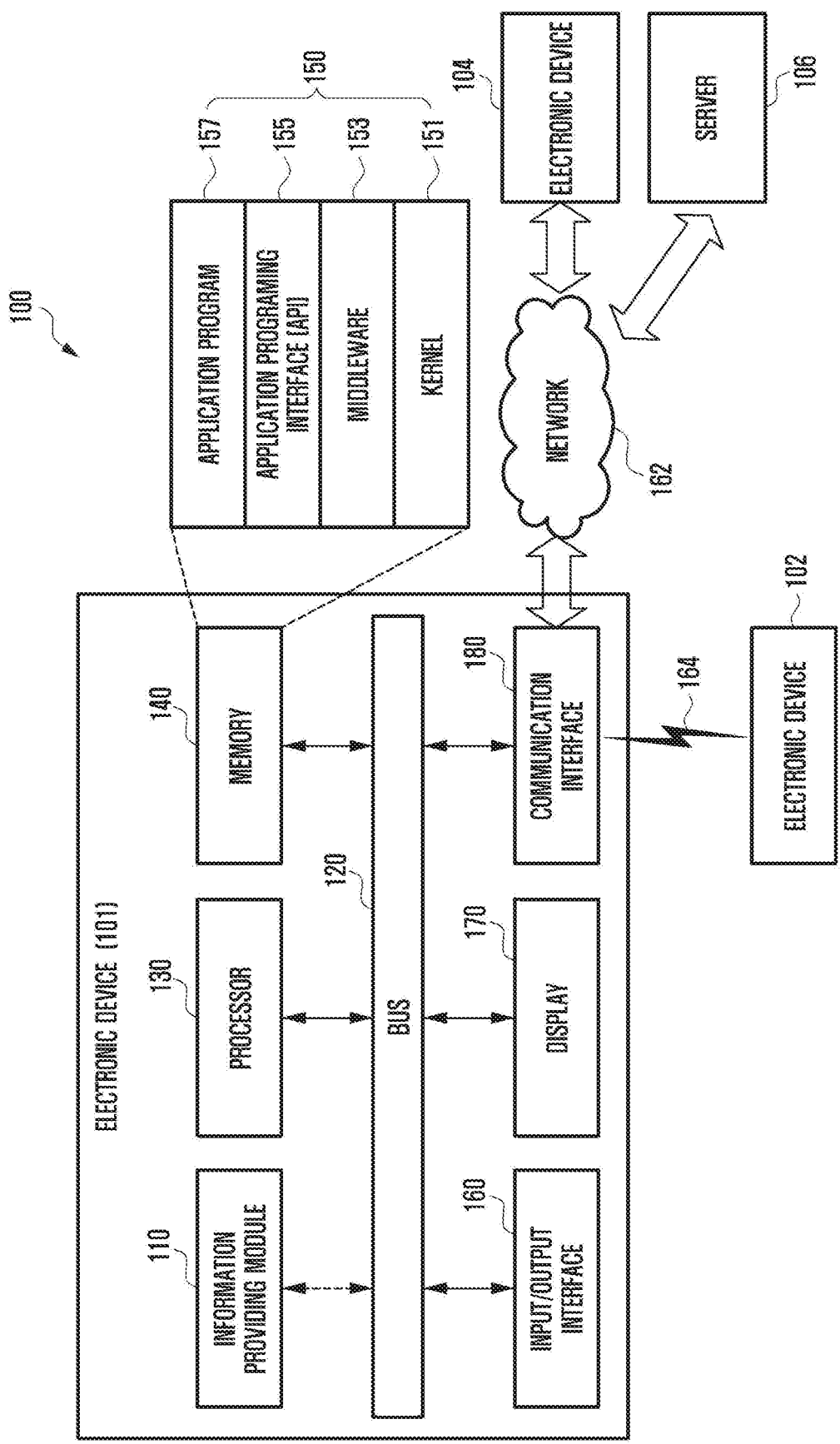
FIG. 1 illustrates an example use environment of a plurality of electronic devices.

Hereinafter, the disclosure will be described with reference to the accompanying drawings. Although example embodiments are illustrated in the drawings and related detailed descriptions are discussed in the disclosure, the disclosure may have various modifications and several examples. However, various examples of the disclosure are not limited to an example implementation form and it should be understood that the disclosure includes all changes and/or equivalents and substitutes included in the spirit and scope of various examples of the disclosure. In connection with descriptions of the drawings, similar components are designated by the same reference numeral.

The term "include" or "may include" which may be used in describing various examples of the disclosure refers to the existence of a corresponding disclosed function, operation or component which can be used in various examples of the disclosure and does not limit one or more additional functions, operations, or components. In various examples of the disclosure, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various examples of the disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various examples of the disclosure may modify various components of the various examples but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the disclosure, a first structural element may be referred to as a second structural element. Similarly, the second structural element also may be referred to as the first structural element.

When it is stated that a component is "coupled to" or "connected to" another component, the component may be directly coupled or connected to another component or another component may exist between the component and another component. In contrast, when it is stated that a component is "directly coupled to" or "directly connected to" another component, a component does not exist between the component and another component.

The terms used in describing various examples of the disclosure are merely examples for describing a given embodiment but do not limit the various examples of the disclosure. Singular forms are intended to include plural forms unless the context clearly indicates otherwise. Unless defined differently, all terms used herein, which include technical terminologies or scientific terminologies, have the same meaning as that understood by a person skilled in the art to which the disclosure belongs. Such terms as those defined in a generally used dictionary are to be interpreted to have the meanings equal to the contextual meanings in the relevant field of art, and are not to be interpreted to have ideal or excessively formal meanings unless clearly defined in the description.

An electronic device according to examples of the disclosure may be a device including a communication function. For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a camera, a wearable device (for example, a Head-Mounted-Device (HMD) such as electronic glasses, electronic clothes, and electronic bracelet, an electronic necklace, an electronic appcessary, an electronic tattoo, and a smart watch.

According to some examples, the electronic device may be a smart home appliance having a communication function. The smart home appliance may include at least one of a TeleVision (TV), a Digital Video Disk (DVD) player, an audio player, an air conditioner, a cleaner, an oven, a microwave oven, a washing machine, an air cleaner, a set-top box, a TV box (for example, Samsung HomeSync™, Apple TV™, or Google TV™), game consoles, an electronic dictionary, an electronic key, a camcorder, and an electronic frame.

According to some examples, the electronic device may include at least one of various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops.

According to some examples, the electronic device may include at least one of furniture or a part of a building/structure, an electronic board, an electronic signature receiving device, a projector, and various types of measuring devices (for example, a water meter, an electricity meter, a gas meter, a radio wave meter and the like) including a camera function. The electronic device according to various examples of the disclosure may be one or a combination of the above described various devices. Further, the electronic device according to various examples of the disclosure may be a flexible device. It will be apparent to those skilled in the art that the electronic device according to various examples of the disclosure is not limited to the above described devices.

Hereinafter, an electronic device according to various examples of the disclosure will be described with reference to the accompanying drawings. The term "user" used in various examples may refer to a person who uses an electronic device or a device (for example, an artificial intelligence electronic device) which uses an electronic device.

According to an example of the disclosure, a screen of an electronic device may be split into at least two windows according to a predefined split manner and displayed through a display of an electronic device. The windows may be referred to as split windows. According to an example, the split windows refer to windows displayed on a display of an electronic display not to be superposed one on another.

According to an example, a popup window may refer to a window displayed on a display of an electronic device to hide or to be superposed on a portion of a screen under execution.

According to an example of the disclosure, an electronic device using a split window and a popup window is capable of displaying two or more application execution screens or function execution screens. Thus, the split windows and the popup window may be referred to as a multi-window.

An electronic device according to various examples will be described with reference to the accompanying drawings. As used herein, the term "user" may indicate a person who uses an electronic device or a device (e.g., an artificial intelligence electronic device) that uses an electronic device. An electronic device 101 within a network environment 100 according to various examples will be described with reference to FIG. 1. The electronic device 101 may include an information providing module 110 in the form of processing circuitry, a bus 120, a processor 130, a memory 140, an input/output interface 160, a display 170, and a communication interface 180. In some examples, the electronic device 101 may omit at least one of the above elements or may further include other elements.

The information providing module 110 may be configured to process at least some of the information obtained from other elements (for example, the processor 130, the memory 140, the input/output interface 160, and the communication interface 180), and provide the user with the obtained information by various methods. For example, the information providing module or processing circuitry 110 may be configured to display an object corresponding to an external electronic device (for example, the electronic devices 102 and 104 or the server 106) through the display 170 functionally connected with the electronic device 101 using the processor 130 or independently from the processor 130. According to an example, the object may have an image corresponding to an appearance of an external electronic device.

According to an example, the information providing module 110 may provide information outputtable by an external electronic device (for example, the electronic device 102) through at least one of the object corresponding to the external electronic device displayed on the display 170 or the external electronic device depending on whether the electronic device 101 is detached from or attached to the user. For example, the external electronic device may be a television. The information providing module 110 may provide (for example, display) at least some of information (for example, an image, text, a sound, or notification information) outputtable through the television on a partial area of the display 170, on which the object having a television image corresponding to the television is displayed. Additional information associated with the information providing module 110 will be described below in conjunction with FIGS. 4 to 12.

The bus 120 may be a circuit connecting the above described components and transmitting communication (for example, a control message) between the above described components.

The processor 130 may include one or more a CPU (central processing unit (CPU)), application processors (application processor (AP)), or communication processors (communication processor (CP)). The Processor 130, for example, may be configured to execute the operation or data processing related to control and/or communication of at least one the other components of the electronic device 101.

The memory 140 stores commands or data received from the processor 130 or other components of the electronic device 101 or generated by the processor 130 or other components of the electronic device 101. The memory 140 may include programming modules 150, for example, a kernel 151, middleware 153, an Application Programming Interface (API) 155, and an application 157. Each of the aforementioned programming modules may be implemented by software, firmware, hardware, or a combination of two or more thereof. The kernel 151 controls or manages system resources (for example, the bus 120, the processor 130, or the memory 140) used for executing an operation or function implemented by the remaining other programming modules, for example, the middleware 153, the API 155, or the application 157. Further, the kernel 151 provides an interface for accessing individual components of the electronic device 101 from the middleware 153, the API 155, or the application 157 to control or manage the components. The middleware 153 performs a relay function of allowing the API 155 or the application 157 to communicate with the kernel 151 to exchange data. Further, in operation requests received from the application 157, the middleware 153 performs a control for the operation requests (for example, scheduling or load balancing) by using a method of assigning a priority, by which system resources (for example, the bus 120, the processor 130, the memory 140 and the like) of the electronic device 101 can be used, to the application 157.

The API 155 may, for example, be an interface by which the application 157 can control a function provided by the kernel 141 or the middleware 153 and includes, for example, at least one interface or function (for example, command) for a file control, a window control, image processing, or a character control.

The input/output interface 160 can receive, for example, a command and/or data from a user, and transfer the received command and/or data to the processor 130 and/or the memory 140 through the bus 120. Examples of the display 170 may include a Liquid Crystal Display (LCD), a Light-Emitting Diode (LED) display, an Organic Light-Emitting Diode (OLED) display, a MicroElectroMechanical Systems (MEMS) display, and an electronic paper display, etc. The display 170, for example, may display various contents (e.g., text, images, videos, icons, or symbols) to the user. The display 170 may include a touch screen and receive, for example, a touch, gesture, proximity, or hovering input using an electronic pen or the user's body part.

The communication interface 180 may enable communication, for example, between the electronic device 101 and an external device (e.g., the first external electronic device 102, the second external electronic device 104, or the server 106). For example, the communication interface 180 may be connected to a network 162 through wireless or wired communication to communicate with the external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication may include, for example, short range communication 164. The short-range communication 164 may include at least one of, for example, Wi-Fi, Bluetooth, Near Field Communication (NFC), infrared communication, and Global Positioning System (GPS). The wired communication may include at least one of, for example, a Universal Serial Bus (USB), a High Definition Multimedia Interface (HDMI), Recommended Standard 232 (RS-232), and a Plain Old Telephone Service (POTS). The network 162 may, for example, include at least one of communication networks, such as a computer network (e.g., a LAN or a WAN), the Internet, and a telephone network.

At least one of the first and second external electronic devices 102 and 104 may be the same or a different type of device from the electronic device 101. According to an example, the server 106 may include a group of one or more servers. According to various examples, all or some of the operations performed in the electronic device 101 may be performed in another electronic device or a plurality of electronic devices (e.g., the electronic devices 102 and 104 or the server 106). According to an example, when the electronic device 101 has to perform some functions or services automatically or in response to a request, the electronic device 101 may make a request for performing at least some functions relating thereto to another device (e.g., the electronic device 102 or 104 or the server 106) instead of performing the functions or services by itself.

The other electronic device (e.g., the electronic device 102 or 104 or the server 106) may carry out the requested functions or the additional functions and transfer the result to the electronic device 101. The electronic device 101 may process the received result as it is or additionally provide the requested functions or services. To this end, for example, cloud computing, distributed computing, or client-server computing technology may be used.

Figure 2:
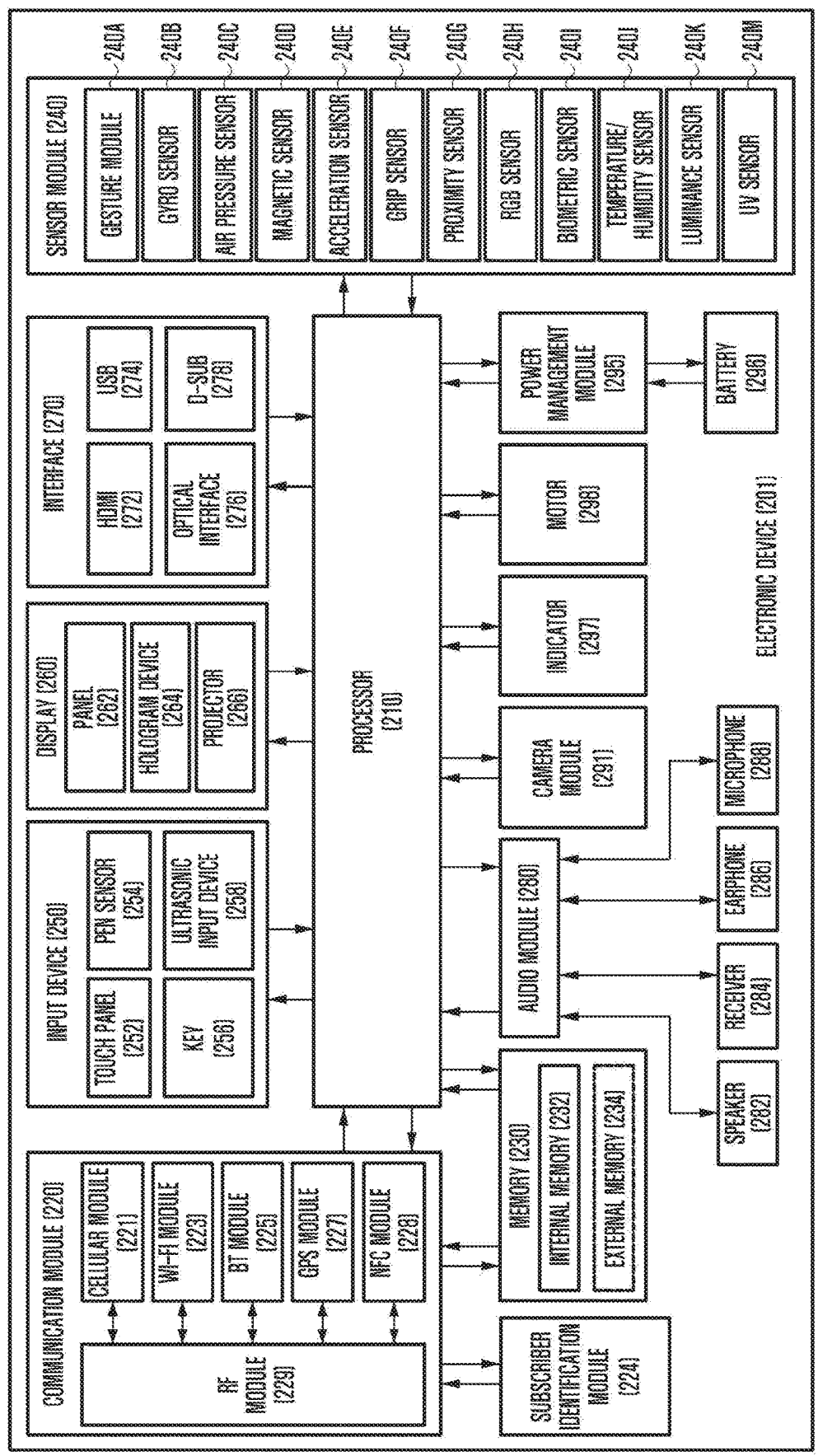
FIG. 2 is a block diagram illustrating an example electronic device.

FIG. 2 is a block diagram illustrating an example electronic device 201. The electronic device 201 may, for example, include a whole or a part of the electronic device 101 illustrated in FIG. 1. Referring to FIG. 2, the electronic device 201 may, for example, include one or more Processors (for example, Application Processors (APs)) 210, a communication module 220, a Subscriber Identification Module (SIM) card 224, a memory 230, a sensor module 240 including various sensors, an input device 250, a display 260, an interface 270, an audio module 280, a camera module 291, a power managing module 295, a battery 296, an indicator 297, and a motor 298.

The processor 210 operates an operating system (OS) or an application program so as to control a plurality of hardware or software component elements connected to the processor 210 and execute various data processing and calculations including multimedia data. The processor 210 may be implemented by, for example, a System on Chip (SoC). According to an example, the processor 210 may further include a Graphic Processing Unit (GPU). The communication module 220 may have a configuration the same or similar to that of the communication interface 180 of FIG. 1. The communication module 220 may include, for example, a cellular module 221, a Wi-Fi module 223, a Bluetooth module 225, a GPS module 227, an NFC module 228, and a Radio Frequency (RF) module 229.

The cellular module 221 may provide a voice call, image call, a text message service, or an Internet service through, for example, a communication network. According to an example, the cellular module 221 may distinguish and authenticate the electronic device 201 within a communication network by using a subscriber identification module 224 (for example, the SIM card). According to an example of the disclosure, the cellular module 221 may perform at least some of the functions that the processor 210 may provide. According to an example, the cellular module 221 may include a Communication Processor (CP).

At least one of the Wi-Fi module 223, the Bluetooth module 225, the GPS module 227, and the NFC module 228 may be, for example, a processor for processing data transceived through a corresponding module. According to an example, at least some (two or more) of the cellular module 221, the Wi-Fi module 223, the Bluetooth module 225, the GPS module 227, and the NFC module 228 may be included in one Integrated Chip (IC) or IC package.

The RF module 229 may transmit/receive, for example, a communication signal (for example, an RF signal). The RF module 229 may include, for example, a transceiver, a Power Amplifier Module (PAM), a frequency filter, a Low Noise Amplifier (LNA), or an antenna. According to another example, at least one of the cellular module 221, the Wi-Fi module 223, the BT module 225, the GPS module 227, and the NFC module 228 may transmit/receive an RF signal through a separate RF module.

The subscriber identification module 224 may include, for example, a card including a subscriber identification module and/or an embedded SIM, and may contain unique identification information (e.g., an Integrated Circuit Card Identifier (ICCID)) or subscriber information (e.g., an International Mobile Subscriber Identity (IMSI)).

The memory 230 (for example, the memory 140) may include, for example, an internal memory 232 or an external memory 234. An internal memory 232 may include at least one of a volatile memory (for example, a Dynamic Random Access Memory (DRAM), a Static RAM (SRAM), a Synchronous Dynamic RAM (SDRAM), and the like, and a non-volatile memory (for example, a One Time Programmable Read Only Memory (OTPROM)), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like.

An external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a Multi Media Card (MMC), a memory stick, or the like. The external memory 234 may be functionally and/or physically connected to the electronic device 201 through various interfaces.

The sensor module 240 may, for example, include various sensors configured to measure a physical quantity or detect an operation state of the electronic device 201, and may convert the measured or detected information into an electrical signal. For example, the sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a Red/Green/Blue (RGB) sensor), a bio-sensor 240I, a temperature/humidity sensor 240J, an illumination sensor 240K, and an Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some examples of the disclosure, an electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. Also, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic waves generated by an input tool through a microphone (for example, a microphone 288) and identify data corresponding to the detected ultrasonic waves.

The display 260 (for example, the display 170) may include a panel 262, a hologram device 264 or a projector 266. The panel 262 may include a configuration identical or similar to that of the display 170 illustrated in FIG. 1. The panel 262 may be implemented to be, for example, flexible, transparent, or wearable. The panel 262 and the touch panel 252 may be implemented as one module. The hologram 264 may show a three dimensional image in the air using an interference of light. The projector 266 may display an image by projecting light onto a screen. The screen may be located, for example, inside or outside the electronic device 201. According to an example, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication interface 180 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 bi-directionally converts a sound and an electronic signal. At least some components of the audio module 280 may be included in, for example, the input/output interface 160 illustrated in FIG. 1. The audio module 280 processes sound information input or output through, for example, a speaker 282, a receiver 284, an earphone 286, the microphone 288 or the like.

The camera module 291 is a device which can photograph a still image and a video. According to an example, the camera module 291 may include one or more image sensors (for example, a front sensor or a back sensor), an Image Signal Processor (ISP) (not shown) or a flash (for example, an LED or xenon lamp).

The power managing module 295 manages power of the electronic device 200. Although not illustrated, the power managing module 295 may include, for example, a Power Management Integrated Circuit (PMIC), a charger Integrated Circuit (IC), or a battery or fuel gauge.

The PMIC may be mounted to, for example, an integrated circuit or an SoC semiconductor. A charging method may, for example, include wired and wireless methods. The charger IC charges a battery and prevent over voltage or over current from flowing from a charger. According to an example, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier or the like may be added.

The battery gauge measures, for example, a remaining quantity of the battery 296, or a voltage, a current, or a temperature during charging. The battery 296 may store or generate electricity and supply power to the electronic device 200 by using the stored or generated electricity. The battery 296 may include a rechargeable battery or a solar battery.

The indicator 297 shows particular statuses of the electronic device 200 or a part (for example, AP 210) of the electronic device 200, for example, a booting status, a message status, a charging status and the like. The motor 298 converts an electrical signal to a mechanical vibration.

Although not illustrated, the electronic device 200 may include a processing unit in the form of a processor (for example, GPU) for supporting a module TV. The processing unit for supporting the mobile TV may process, for example, media data according to a standard of Digital Multimedia Broadcasting (DMB), Digital Video Broadcasting (DVB), media flow or the like.

Each of the components of the electronic device according to various examples of the disclosure may be implemented by one or more components and the name of the corresponding component may vary depending on a type of the electronic device. The electronic device according to various examples of the disclosure may include at least one of the above described components, a few of the components may be omitted, or additional components may be further included. Also, some of the components of the electronic device according to various examples of the disclosure may be combined to form a single entity, and thus may equivalently execute functions of the corresponding components before being combined.

Figure 3:
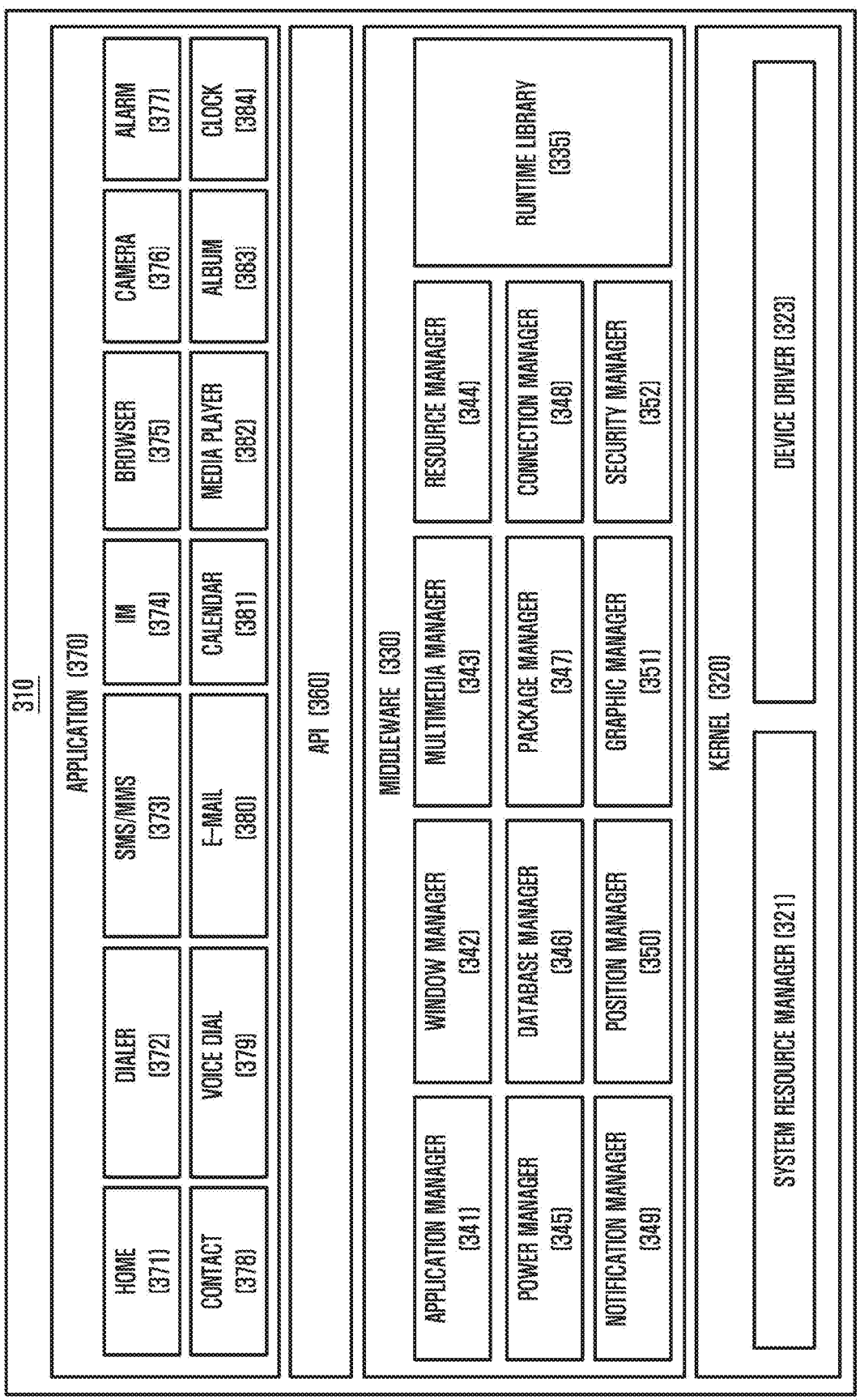
FIG. 3 is a block diagram illustrating an example electronic device.

FIG. 3 is a block diagram illustrating an example program module. According to an example, a program module 310 (for example, the program 150) may include an Operating System (OS) for controlling resources related to the electronic device (for example, the electronic device 101) and/or various applications (for example, application programs 157) executed in the operating system. The operating system may be, for example, Android, iOS, Windows, Symbian, Tizen, Bada, or the like.

The program module 310 may include a kernel 320, middleware 330, an Application Programming Interface (API) 360, and/or an application 370. At least some of the program module 310 may be preloaded on the electronic device, or may be downloaded from an external electronic device (e.g., the electronic device 102 or 104, or the server 106).

The kernel 320 (e.g., the kernel 151) may include, for example, a system resource manager 321 and/or a device driver 323. The system resource manager 321 may perform the control, allocation, retrieval, or the like of system resources. According to an example of the disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may, for example, provide a function required by the applications 370 in common or provide various functions to the applications 370 through the API 360 so that the applications 370 can efficiently use limited system resources within the electronic device. According to an example, the middleware 330 (for example, the middleware 153) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, or the like. The application manager 341 may manage, for example, the life cycle of at least one of the applications 370. The window manager 342 may manage Graphical User Interface (GUI) resources used for the screen. The multimedia manager 343 may determine a format required to reproduce various media files, and may encode or decode a media file by using a coder/decoder (codec) appropriate for the corresponding format. The resource manager 344 may manage resources, such as a source code, a memory, a storage space, and the like of at least one of the applications 370.

The power manager 345 may operate together with a Basic Input/Output System (BIOS) to manage a battery or power and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic device. The graphic manager 351 may manage a graphic effect, which is to be provided to the user, or a user interface related to the graphic effect. The security manager 352 may provide various security functions required for system security, user authentication, and the like. According to an example, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 (e.g., the API 155) may, for example, be a set of API programming functions, and may be provided with a different configuration according to an OS. For example, in the case of Android or iOS, one API set may be provided for each platform. In the case of Tizen, for example, two or more API sets may be provided for each platform.

The applications 370 (for example, the application programs 157) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information).

According to an example, the applications 370 may include an application (hereinafter, referred to as an "information exchange application" for convenience of description) supporting information exchange between the electronic device (e.g., the electronic device 101) and an external electronic device (e.g., the electronic device 102 or 104). The application associated with information exchange may include, for example, a notification relay application for forwarding specific information to an external electronic device, or a device management application for managing an external electronic device.

For example, the notification relay application may include a function of delivering, to the external electronic device (e.g., the electronic device 102 or 104), notification information generated by other applications (e.g., an SMS/MMS application, an email application, a health care application, an environmental information application, etc.) of the electronic device 101. Further, the notification relay application may receive notification information from, for example, an external electronic device and provide the received notification information to a user.

For example, the device management application may manage (for example, install, delete, or update) at least one function of an external electronic device (for example, the electronic devices 102 and 104) communicating with the electronic device (for example, a function of turning on/off the external electronic device itself (or some components) or a function of adjusting luminance (or a resolution) of the display), applications operating in the external electronic device, or services provided by the external electronic device (for example, a call service and a message service).

According to an example, the applications 370 may include applications (for example, a health care application of a mobile medical appliance or the like) designated according to attributes of the external electronic device 102 or 104. According to an example, the application 370 may include an application received from the external electronic device (e.g., the server 106, or the electronic device 102 or 104). According to an example, the application 370 may include a preloaded application or a third party application which can be downloaded from the server. Names of the elements of the program module 310, according to the above-described examples, may change depending on the type of OS.

According to various examples, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an Application-Specific Integrated Circuit (ASIC) chip, a Field-Programmable Gate Arrays (FPGA), and a programmable-logic device for performing operations which have been known or are to be developed hereinafter.

According to various examples, at least some of the devices (for example, modules or functions thereof) or the method (for example, operations) according to the disclosure may be implemented by a command stored in a computer-readable storage medium in a programming module form. The instruction, when executed by a processor (e.g., the processor 130), may cause the one or more processors to execute the function corresponding to the instruction. The computer-readable storage medium may be, for example, the memory 140.

The computer readable recoding medium may include a hard disk, a floppy disk, magnetic media (for example, a magnetic tape), optical media (for example, a Compact Disc Read Only Memory (CD-ROM) and a Digital Versatile Disc (DVD)), magneto-optical media (for example, a floptical disk), a hardware device (for example, a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device according to various examples may be configured to be operated as one or more software modules in order to perform the operation of the disclosure, and vice versa.

The module or the programming module, e.g., processing circuitry, according to various examples may include one or more of the aforementioned components or may further include other additional components, or some of the aforementioned components may be omitted. Operations executed by a module, a programming module, or other component elements according to various examples may be executed sequentially, in parallel, repeatedly, or in a heuristic manner. Further, some operations may be executed according to another order or may be omitted, or other operations may be added. The examples disclosed herein are suggested for describing and helping understanding of disclosed technical contents, and do not limit the scope of the technology described in the disclosure. Accordingly, the scope of the disclosure should be construed as including all modifications or various other examples based on the technical idea of the disclosure. Hereinafter, information related to an apparatus and a method of providing information by using an object corresponding to an external electronic device (for example, the electronic devices 102 and 104, or the server 106 are provided with reference to FIGS. 4 to 12.

Figure 4:
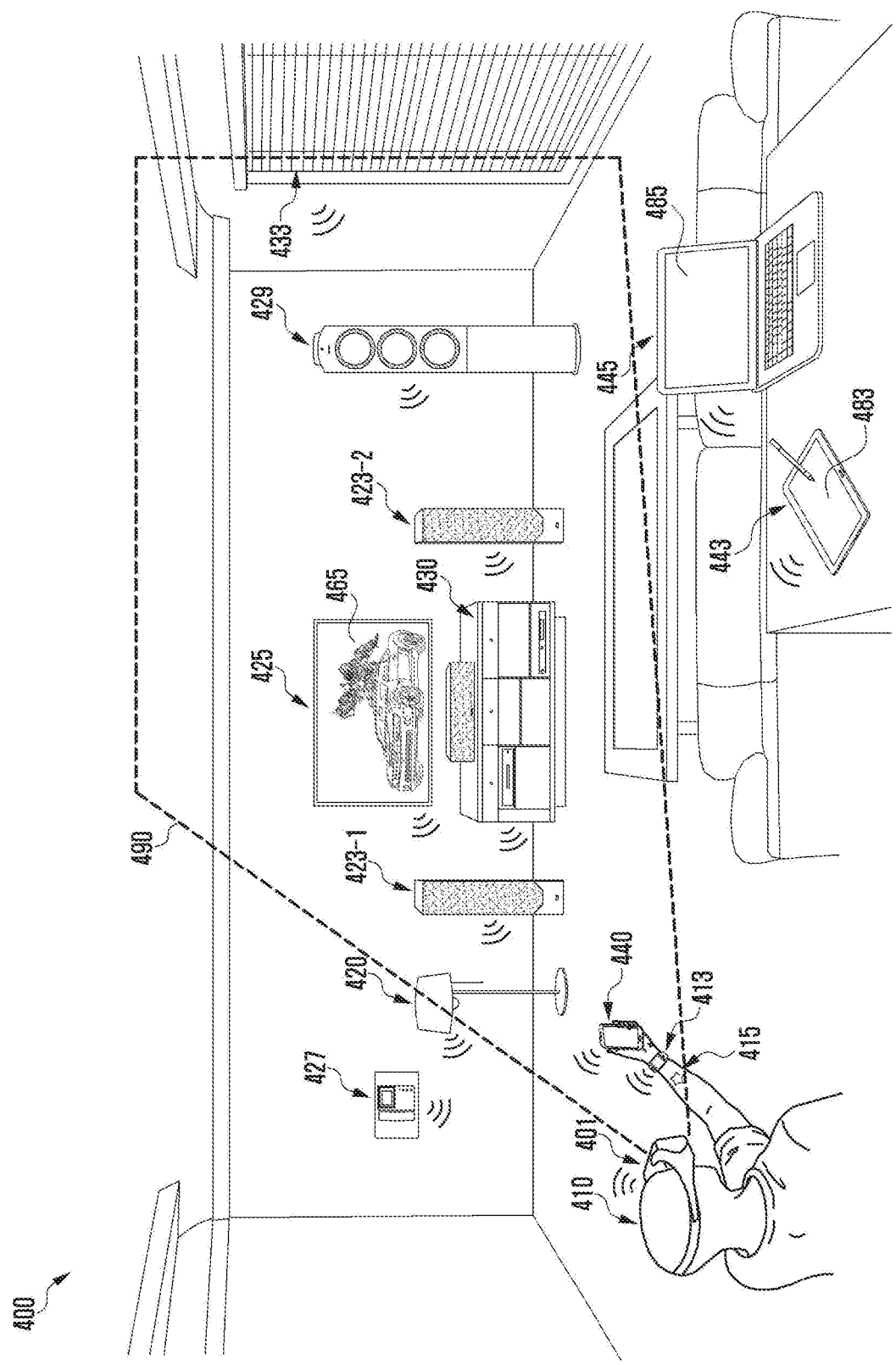
FIG. 4 illustrates an example of an actual use environment, in which an electronic device is linked with an external electronic device.
Figure 5:
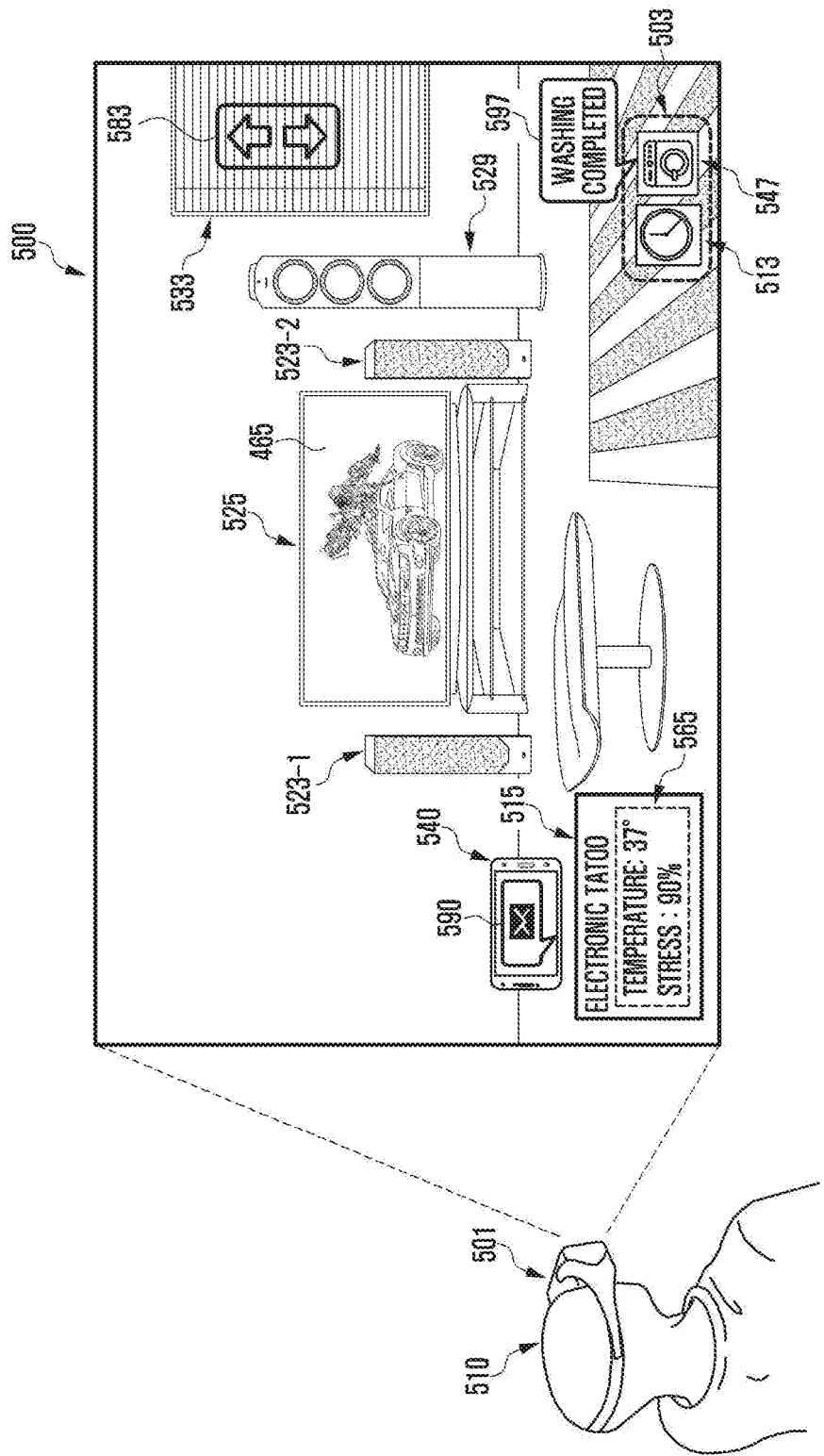
FIG. 5 illustrates an example of a virtual environment provided by an electronic device.

Hereinafter, an actual use environment and a virtual environment corresponding to the actual use environment will be described with reference to FIGS. 4 and 5. FIG. 4 illustrates an example of an actual use environment 400, in which an electronic device (for example, the electronic device 101) is linked with an external electronic device (for example, the electronic devices 102 and 104, and the server 106) within a designated space, and FIG. 5 illustrates an example of a virtual environment 500 provided by an electronic device (for example, the electronic device 101).

Referring to FIG. 4, an actual use environment 400 may be an environment, in which a plurality of electronic devices located within a space is linked with each other to provide a user 410 with information, based on the space in which the user 410 is located. For example, if the user 410 is located in, for example, a living room, the actual use environment 400 may be an environment, in which a plurality of electronic devices 401 (413 to 445) located in the living room provides the user 410 with information. For another example, although not illustrated, if the user 410 is located in an office, the actual use environment 400 may be an environment providing the user 410 with information through the linkage of a plurality of electronic devices located in the office.

Referring to FIG. 4, the user 410 may wear a Head-Mounted Device (HMD) 401 (for example, the electronic device 101) in a living room and look at a partial area 490 of the living room. For example, the external electronic devices 413 to 445 for the HMD 401 may be located in the living room. The external electronic devices 413 to 445 may be, for example, an electronic watch 413, an electronic tattoo 415, a lighting 420, speakers 423-1 and 423-2, a television 425, an interphone 427, an air conditioner 429, an electronic drawer 430, a smart blind 433, a smart phone 440, a tablet PC 443, or a laptop PC 445. According to various examples, the external electronic devices 413 to 445 are not limited to the aforementioned devices, and may include various electronic devices. According to various examples, the electronic device 401 is not limited to the illustrated HMD 401, and may be various devices capable of providing the user 410 with visual information.

According to an example, at least some of the electronic device 401 and the external electronic devices 413 to 445 may be connected with each other through wired or wireless communication. For example, at least some of the electronic device 401 and the external electronic devices 413 to 445 may be directly connected through a local network including a home network or Device to Device (D2D) communication.

According to an example, at least some of the external electronic devices 413 to 445 may output information (for example, a notification or contents). For example, the television 425 may output a video 465. The tablet PC 443 may output text 483. The laptop PC 445 may output a document 485. Further, the electronic drawer 430 may output a notification notifying that a drawer is opened. The smart phone 440 may output a notification notifying a reception of a text message. For example, the notification may be a notification sound, vibration, scent, light, waves corresponding to a brainwave of a person, or an image, and the external electronic devices 413 to 445 may output at least one of the aforementioned notifications through which the user is capable of recognizing states or locations of the external electronic devices 413 to 445.

According to an example, based on information, which has been output or is to be output through the external electronic devices 413 to 445, the electronic device 401 may provide the user 410 with contents corresponding to the information together with a virtual environment. For example, the notification provided by the electronic drawer 430 and notifying that the drawer is opened may be provided in a form of an image through the electronic device 401. For example, although not illustrated, the image may be displayed at least a part of a region, in which an object corresponding to the electronic drawer 430 displayed on the virtual environment is displayed.

Referring to FIG. 5, according to an example, a virtual environment 500 may be provided through an electronic device 501 (for example, a display (for example, the display 170) functionally connected with the electronic device 501). The virtual environment 500 may include an image (for example, a still image or a video) identical or similar to an actual use environment (for example, the actual use environment 400), in which the electronic device 501 or external electronic devices for the electronic device 501 are disposed. For example, if the actual use environment is a living room, the virtual environment 500 may include an image (an image of a picture of the living room or a drawing image of the living room) for the living room. For another example, the virtual environment 500 may include an image for an environment different from the actual use environment. For example, a space, in which the electronic device 501 and a user 510 are actually located, is the "living room", but the virtual environment 500 may include a "classroom".

According to an example, the electronic device 501 may provide the virtual environment 500 different from the actual space based on contents which have been provided (or are to be provided) to the user 510 or a user's input. For example, if the user 510 desires a simulation for "shopping", the electronic device 501 may provide an image for a shopping mall as an example of the virtual environment 500. As another example, if the contents are movie contents, the electronic device 501 may provide an image of a movie theater as the virtual environment 500. According to an example, the virtual environment 500 may include a 3D image, as well as a 2D image.

According to an example, one or more objects 513 to 540 (hereinafter, candidate objects for convenience of description) corresponding to one or more external electronic devices (hereinafter, for convenience of description, "candidate electronic devices") among the external electronic devices 413 to 445 disposed in the space (for example, the living room), in which the electronic device 501 is located, or other external electronic devices disposed in a space (not shown) different from the space may be displayed on the virtual environment 500.

For example, the electronic watch 413, the electronic tattoo 415, the speakers 423-1 and 423-2, the television 425, the air conditioner 429, the smart phone 440, and the smart blind 433, which are disposed in a region 490 (viewed by the user) corresponding to the gaze of the user 510 among the external electronic devices 413 to 445 may be selected as candidate electronic devices. Further, for example, a washing machine located at another space (for example, a utility room) connected with the electronic device 501 through a local network may be selected as a candidate electronic device. Additional information about the method of selecting the candidate electronic device will be described with reference to FIG. 6.

The candidate objects 513 to 547 may be, for example, an image, text, a video, or an icon corresponding to the candidate electronic device. According to an example, the candidate objects 513 to 547 may be images related to an appearance of the candidate electronic device. For example, the candidate objects 513 to 547 may include speaker images 523-1 and 523-2 identical or similar to appearances of the speakers 423-1 and 423-2, a television image 525 identical or similar to an appearance of the television 425, an image 529 different from an actual image of the air conditioner 429 but representing the air conditioner 429, an image 533 different from an actual image of the smart blind 433 but representing the smart blind 433 and an image 540 different from an actual image of the smart phone 440 but representing the smart phone 440, e.g., icons.

According to an example, the candidate objects 515 to 547 may include, for example, text (for example, a product name or identification information) for the candidate electronic device. For example, the candidate objects 515 to 547 may be an output window 515 including "electronic tattoo" that is text corresponding to the electronic tattoo 415.

According to an example, the candidate objects 513 to 547 may be icons for the candidate electronic devices. For example, the candidate objects 513 to 547 may include an electronic watch icon 513 representing the electronic watch 413 or a washing machine icon 547 representing a washing machine.

According to an example, the candidate objects 513 to 547 may be displayed on a region of the virtual environment 500 corresponding to relative positions of the candidate electronic devices for the electronic device 501. The user 510 may use the HMD 501 that is the electronic device 510 at a first location corresponding to a left-rear side of the living room. The user 510 may be attached with the electronic tattoo 415 on his/her arm, and hold the smart phone 440 with a hand. Accordingly, locations of the electronic tattoo 415 and the smart phone 440 may be the same as or similar to the location of the HMD 501. For example, the electronic tattoo object 515 corresponding to the electronic tattoo 415 and the smart phone object 540 corresponding to the smart phone 440 may be displayed in a first region corresponding to a left lower side of the virtual environment 500 as candidate objects.

For example, the television 425 may be located at a second location corresponding to a center front side of the living room. In this case, the television object 525 corresponding to the television 425 may be displayed in a second region corresponding to the center front side of the virtual environment 500 as a candidate object. For example, the first speaker 423-1 and the second speaker 423-2 may be located at third locations which are both sides of the television 425 in the living room. In this case, the first speaker object 523-1 and the second speaker object 523-2 corresponding to the first speaker 423-1 and the second speaker 423-2, respectively, may be displayed on third regions, which are both sides of the television 525 in the virtual environment 500, as a candidate objects.

For example, the air conditioner 479 may be located at a fourth location corresponding to a front side of the living room. For example, the air conditioner object 529 corresponding to the air conditioner 429 may be displayed in a fourth region corresponding to a right center side of the virtual environment 500 as a candidate object. For example, the smart blind 433 may be located at a fifth location corresponding to a right front side of the air conditioner 579 in the living room. In this case, the smart blind object 533 corresponding to the smart blinder 433 may be displayed in a fifth region corresponding to a right upper end of the air conditioner object 529 in the virtual environment 500 as a candidate object.

According to an example, the candidate objects 513 to 547 may be displayed on a region 503 designated in the virtual environment 500. For example, the right lower region 503 may be designated as a region for displaying the candidate objects 513 to 547 in the virtual environment 500. Accordingly, the electronic watch object 513 corresponding to the electronic watch 413 and the washing machine 547 corresponding to the washing machine may be displayed on the region 503 designated for displaying the objects.

According to an example, contents may be provided in relation to the region, on which at least some objects (hereinafter, target objects for convenience of description) among one or more candidate objects displayed in the virtual environment 500. The contents may correspond to information to be output by at least some electronic devices (hereinafter, referred to as target electronic devices for convenience of description) corresponding to the target objects among one or more candidate electronic devices.

For example, text 565 "Body temperature: 37°, and Stress: 90%" corresponding to information on a body temperature and a degree of stress of the user 510, which is provided through the electronic tattoo 415, may be provided through the region on which the electronic tattoo object 515 is displayed. For example, contents 465 (for example, a movie) to be output through the television 425 may be provided through the region, on which the television object 525 that is the target object is displayed. For example, the text message icon 590 corresponding to notification information about the reception of the text message to be provided by the smart phone 440 may be provided through the region on which the smart phone object 540 that is the target object is displayed. For example, text 597 corresponding to notification information about "washing is completed" to be output by the washing machine may be provided through an upper region of the region, on which the washing machine object 547 that is the target object is displayed.

According to an example, a control menu (for example, an image, text, or an icon) for controlling the target electronic device may be provided in relation to the region, on which the target object is displayed, in the virtual environment 500. For example, a control menu 583 for opening or closing the smart blind 433 may be provided through the region, on which the smart blind object 533 is displayed.

Figure 6:
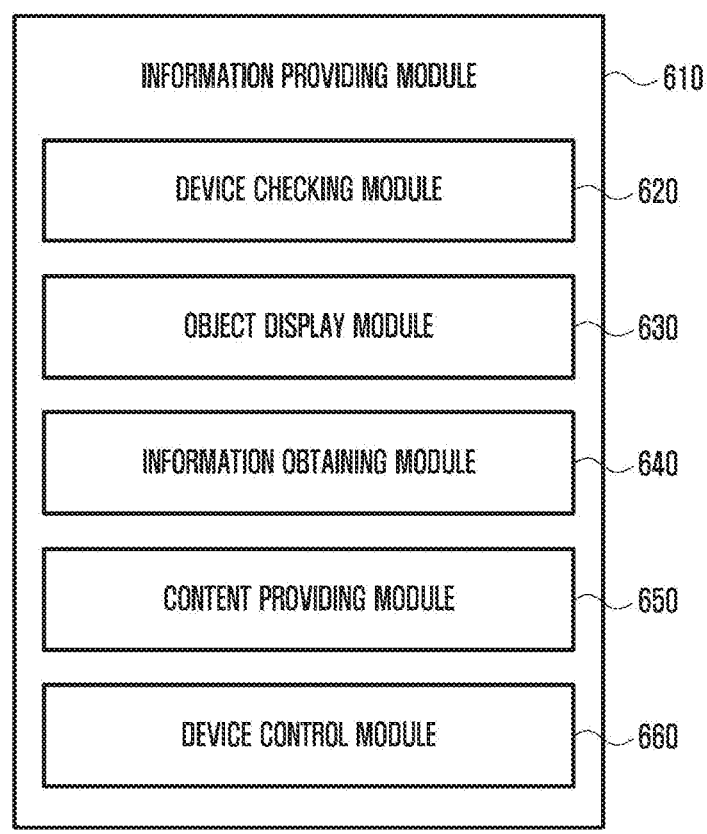
FIG. 6 is a block diagram illustrating an example information providing module.

FIG. 6 is a block diagram illustrating an example information providing module (for example, the information providing module 110 in the form, for example, of processing circuitry) included in an electronic device (for example, the electronic device 101). Hereinafter, the description of the same or similar parts as those in FIGS. 1 to 5 will be omitted. Referring to FIG. 6, an information providing module 610 may include, for example, a device checking module 620, an object display module 630, an information obtaining module 640, a content providing module 650, and a device control module 660. According to an example, at least some of the device checking module 620, the object display module 630, the information obtaining module 640, the content providing module 650, and the device control module 660 may be implemented by hardware, software, or firmware, or any combination thereof which is capable of performing or being configured to perform designated operations.

The device checking module 620 may be configured to check, for example, a candidate electronic device among one or more external electronic devices (for example, the electronic devices 102 and 104, and the server 106) for the electronic device. According to an example, the device checking module 620 may be configured to recognize (for example, scan) one or more external electronic devices communicable with the electronic device. One or more external electronic devices may be devices connected with the electronic device through a network (for example, the network 162) or a short range communication (for example, the short range communication 164).

For example, the device checking module 620 may be configured to transmit a request signal requesting communication to the plurality of external electronic devices through Wi-Fi communication (or Bluetooth, infrared communication, or short range communication). The device checking module 620 may be configured to receive a response signal for the request signal from one or more external electronic devices communicable through the Wi-Fi communication among the plurality of external electronic devices. Accordingly, the device checking module 620 may be configured to recognize the one or more external electronic devices. For example, the device checking module 620 may be configured to receive a signal transmitted (for example, broadcasted) from one or more external electronic devices (a Bluetooth Low Energy (BLE) tag included in the one or more external electronic devices) without requesting communication from the plurality of external electronic devices. Accordingly, the device checking module 620 may recognize the one or more external electronic devices.

According to an example, the device checking module 620 may be configured to recognize one or more external electronic devices in response to the use (e.g., wearing) of the electronic device by a user. For example, if the electronic device is a wearable device, the device checking module 620 may be configured to check whether the electronic device is worn by the user. Accordingly, if the electronic device is worn by the user, the device checking module 620 may recognize, for example, the one or more external electronic devices. On the other hand, if the electronic device is not worn by the user, the device checking module 620 may not recognize, for example, the one or more external electronic devices. According to various examples, the device checking module 620 may recognize one or more external electronic devices based on various user's inputs (for example, selection of a menu item related to the recognition of the external electronic device), as well as whether the user uses the electronic device.

According to various examples, the device checking module 620 may be configured to automatically recognize one or more external electronic devices. For example, the device checking module 620 may be configured to periodically (for example, once for about each one hour) recognize one or more external electronic devices. For example, the device checking module 620 may recognize one or more external electronic devices in response to an operation of the one or more external electronic devices. For example, the device checking module 620 may detect a signal corresponding to a turn-on operation of the one or more external electronic devices. The device checking module 620 may recognize the one or more external electronic devices based on the signal.

According to an example, the device checking module 620 may be configured to select a candidate electronic device from the recognized one or more external electronic devices. According to an example, the device checking module 620 may be configured to select an electronic device located within a designated range from the electronic device as a candidate electronic device. The designated range may include at least one of, for example, a range detectable by a sensor (for example, the image sensor) included in the electronic device, a range, in which short range communication (for example, the short range communication 164) with the electronic device may be established, a range, in which communication with the electronic device with a designated signal intensity or more may be established, or ranges connected with each other through a local network.

For example, the device checking module 620 may select an electronic device located at a place, which the user may visually recognize, among the recognized one or more external electronic devices as a candidate electronic device. To this end, the device checking module 620 may be configured to obtain an image at a location corresponding to the gaze of the user through the image sensor included in the electronic device. The device checking module 620 may select one or more electronic devices include in the image as a candidate electronic device.

For example, the device checking module 620 may be configured to select an electronic device located to be approximate to the user among the recognized one or more external electronic devices as a candidate electronic device. To this end, the device checking module 620 may select one or more electronic devices, which may establish short range communication (for example, Wi-Fi, Bluetooth, or infrared communication) with the electronic device among the one or more external electronic devices connected with the electronic device through various communication methods, as a candidate electronic device.

For example, the electronic device may include an infrared communication module communicable with an external electronic device corresponding to a designated direction. The device checking module 620 may select an external electronic device located in a desired direction as a candidate electronic device by using the infrared communication module. For example, the device checking module 620 may receive an infrared signal from one or more external electronic devices located in a direction corresponding to the infrared communication module through infrared communication. For example, the device checking module 620 may select the one or more external electronic devices as a candidate electronic device.

Further, the device checking module 620 may be configured to select, for example, one or more electronic devices, in which a communication signal intensity between the electronic device and one or more external electronic devices is a designated signal intensity or more (for example, high when signal intensity is divided into high, middle, and low), among the recognized one or more external electronic devices as a candidate electronic device.

Further, for example, the recognized one or more external electronic devices may be connected within the electronic device through various networks. For example, the device checking module 620 may select one or more electronic devices connected through the local network (for example, a home network) among the one or more external electronic devices as a candidate electronic device.

According to an example, the device checking module 620 may be configured to select a candidate electronic device based on an input, such as, for example, a user input. For example, the device checking module 620 may be configured to recognize, for example, the gaze of the user for the electronic device through an eye recognizing sensor functionally connected with the electronic device (for example, included in the electronic device). The device checking module 620 may be configured to select an electronic device corresponding to the gaze of the user among the one or more external electronic devices as a candidate electronic device. Further, for example, the device checking module 620 may be configured to recognize, for example, a motion of the user (for example, a motion of indicating the electronic device with a hand or a finger of the user) through the image sensor functionally connected with the electronic device. The device checking module 620 may select an electronic device corresponding to the motion (for example, the electronic device indicated by the hand or the finger of the user) as a candidate electronic device.

According to an example, the device checking module 620 may be configured to select a candidate electronic device based on operation states of one or more communicable external electronic devices. For example, the device checking module 620 may be configured to select an electronic device which is outputting (or is to output) information (for example, contents, a sound, scent, light, radio waves, or vibrations) among one or more external electronic devices as a candidate electronic device. For example, the device checking module 620 may be configured to obtain, for example, operation information about an external electronic device regarding whether one or more external electronic devices are outputting information, through wired or wireless communication. Based on the operation information, the device checking module 620 may select the electronic device, which is outputting the information, as a candidate electronic device.

For example, the device checking module 620 may be configured to obtain, for example, an image of a first external electronic device, which outputs a video through a display and an image of a second external electronic device, which does not output the information, through the image sensor. For example, based on the images, the device checking module 620 may select the first external electronic device as a candidate electronic device.

The object display module 630 may be configured to display a candidate object corresponding to the candidate electronic device. According to an example, the object display module 630 may be configured to display a virtual environment (for example, the virtual environment 500) for displaying a candidate object through a display (for example, the display 170) functionally connected with the electronic device. According to an example, the object display module 630 may be configured to select a virtual environment to be displayed through the electronic device among a plurality of virtual environments based on at least one input for the electronic device. The object display module 630 may be configured to provide the selected virtual environment. According to an example, the object display module 630 may be configured to display a virtual environment obtained through the candidate electronic device or another external electronic device through the display. For example, the object display module 630 may be configured to obtain a virtual environment through a candidate electronic device based on a communication connection between the candidate electronic device and the electronic device or a request of the user. Additional information on the method of providing the virtual environment will be described with reference to FIG. 7 below.

According to an example, the object display module 630 may be configured to display the candidate object within the virtual environment. For example, the object display module 630 may display the candidate object through a region corresponding to a location of the candidate electronic device in an actual use environment or a region (for example, the region 503) designated for displaying the candidate object.

According to an example, the object display module 630 may be configured to differently display the candidate objects based on processing information for the candidate object or the virtual environment. The processing information may, for example, include information on a time, for which the gaze of the user for the candidate electronic device stays, or a degree of communication connection (paring) with the electronic device. According to an example, the object display module 630 may be configured to display the candidate object with a chroma, luminance, brightness, light and shade, transparency, color, shape, shaking, motion or a size designated according to the time, for which the gaze of the user for the candidate electronic device stays, or a communication connection state. For example, if the user views the candidate electronic device for a first time (for example, about 5 seconds), the object display module 630 may be configured to display the candidate object with a first color (for example, black and white colors), if the user views the candidate electronic device for a second time (for example, about 30 seconds) longer than the first time, the object display module 630 may display the candidate object with a second color (for example, colors).

For example, the object display module 630 may be configured to display the candidate object with a different size according to the communication connection state between the electronic device and the candidate electronic device. For example, the communication connection state may be divided into a "communication connection attempt", "ongoing communication connection", and "communication connection completion". If the communication connection state between the electronic device and the candidate electronic device is the "communication connection attempt", the object display module 630 may be configured to display the candidate object with a first size. If the communication connection state between the electronic device and the candidate electronic device is changed to the "ongoing communication connection", the object display module 630 may change a size of the candidate object to a second size larger than the first size. If the communication connection state between the electronic device and the candidate electronic device is changed to the "communication connection completion", the object display module 630 may change a size of the candidate object to a third size larger than the second size.

For convenience of description, the communication connection state is divided into three steps (for example, the "communication connection attempt", the "ongoing communication connection", and the "communication connection completion"), but may be variously set according to various examples. For example, the communication connection state may be divided into four steps, that is, "communication connection attempt", "ongoing communication connection by 40%", "ongoing communication connection by 80%", and "communication connection completion". Additional information about the method of displaying the candidate object with a designated format will be described with reference to FIG. 11.

According to an example, the object display module 630 may be configured to display a user interface (for example, a progress bar or a loading bar) indicating a degree of processing the candidate object or the virtual environment in relation to the candidate object. For example, the object display module 630 may be configured to display a progress bar for displaying a time, for which the gaze of the user for the candidate object stays, in the region, in which the candidate object is displayed. If the gaze of the user for the candidate object stays for the first time (for example, about 5 seconds), the object display module 630 may display a first progress bar indicating a first percentage (for example, about 30%). Further, if the gaze of the user for the candidate object stays for the second time (for example, about 15 seconds) longer than the first time, the object display module 630 may display a second progress bar indicating a second percentage (for example, about 90%) larger than the first percentage.

According to an example, the object display module 630 may be configured to differently display the plurality of candidate objects so that the plurality of objects is discriminated from each other. The object display module 630 may be configured to display, for example, the plurality of candidate objects with different frequencies, colors, or brightness so that the plurality of candidate objects is discriminated through a brainwave signal of the user viewing the plurality of candidate objects. For example, the object display module 630 may be configured to check a first region of the display for displaying a first candidate object and a second region of the display for displaying a second candidate object. The object display module 630 may be configured to display the first candidate object at a first frequency (for example, about 60.2 Hz) through the first region, and display the second candidate object at a second frequency (for example, about 60.4 Hz) through the second region.

For example, the object display module 630 may be configured to display the first candidate object with a first color (for example, red) and display the second candidate object with a second color (for example, blue). Further, the object display module 630 may be configured to display the first candidate object with first brightness (for example, about 2 lux), and display the second candidate object with second brightness (for example, about 5 lux).

The information obtaining module 640 may be configured to obtain, for example, information (for example, the video 465, the text 483, and the text message 485) to be output (or currently output) through a target electronic device corresponding to a target object among one or more candidate objects. According to an example, the information obtaining module 640 may be configured to determine a target object based on a user's input (for example, a gesture, a touch, or the eye), execution information of the candidate electronic device, or the motion information about the candidate electronic device.

For example, the information obtaining module 640 may be configured to check the gaze of the user based on a user's input. If the gaze of the user corresponds to the first candidate object, the information obtaining module 640 may be configured to determine the first candidate object as a target object. If the gaze of the user corresponds to a second candidate object, the information obtaining module 640 may determine the second candidate object as a target object.

For example, if the electronic device is an HMD, the information obtaining module 640 may be configured to recognize, for example, a motion (for example, rotation) of a head of the user based on a user's input through a motion sensor functionally connected with the electronic device (for example, included in the electronic device). If the motion corresponds to a first motion corresponding to the first candidate object (for example, the head rotates in a first direction corresponding to the first candidate object), the information obtaining module 640 may determine the first candidate object as a target object. If the motion corresponds to a second motion corresponding to the second candidate object (for example, the head rotates in a second direction corresponding to the second candidate object), the information obtaining module 640 may determine the second candidate object as a target object. For example, the electronic device (for example, the electronic device 101) may use at least one of the gesture sensor 240A, the gyro sensor 240B, and the acceleration sensor 240E in the sensor module 240 as a motion sensor.

For example, the information obtaining module 640 may be configured to determine a target object based on biometric information (for example, a brainwave) of the user as a user's input. For example, the brainwave of the user may be differently measured according to visual information viewed by the user (for example, an output frequency, a color, or brightness of visual information). For example, if a first image is output on the display at the first frequency (for example, about 60.2 Hz), the brainwave of the user viewing the first image may be a first signal. Further, if a second image is output on the display at the second frequency (for example, about 60.4 Hz), the brainwave of the user viewing the second image may be a second signal. Accordingly, the information obtaining module 640 may be configured to check an image viewed by the user corresponding to the brainwave between the first image and the second image by using the brainwave obtained through a brainwave recognizing sensor functionally connected with the electronic device.

For example, the object display module 630 may be configured to output the first candidate object through the display at the first frequency, and output the second candidate object through the display at the second frequency. In this case, the information obtaining module 640 may be configured to obtain the brainwave of the user. If the brainwave of the user is the first signal corresponding to the first frequency, the information obtaining module 640 may be configured to determine the first candidate object as a target object. If the brainwave of the user is the second signal corresponding to the second frequency, the information obtaining module 640 may be configured to determine the second candidate object as a target object.

For example, the information obtaining module 640 may be configured to check information about reception of a notification by the candidate electronic device as execution information. Accordingly, the information obtaining module 640 may be configured to determine the candidate object corresponding to the candidate electronic device as a target object. For example, the information obtaining module 640 may be configured to check information about completion of washing by the washing machine that is the candidate electronic device as execution information. Accordingly, the information obtaining module 640 may determine the washing machine object corresponding to the washing machine as a target object.

The information obtaining module 640 may be configured to check, for example, motion information about one or more candidate electronic devices. For example, if the motion information corresponds to designated motion information, the object display module 630 may be configured to determine a candidate object corresponding to the candidate electronic device as a target object. For example, if a user wearing an electronic watch raises his/her arm in a direction of a face of the user, the information obtaining module 640 may be configured to determine that the user intends to check the electronic clock. Accordingly, the motion information corresponding to the movement of the electronic watch in an upper direction may be set as the designated motion information. For example, a motion sensor included in the electronic watch may detect the motion information corresponding to the movement of the electronic watch in the upper direction. For example, the information obtaining module 640 may obtain the motion information from the electronic watch. The information obtaining module 640 may determine the electronic watch as a target electronic device based on the motion information.

According to an example, motion information about one or more candidate electronic devices may be checked by various sensors, such as the image sensor functionally connected with the one or more candidate electronic devices or the electronic device, as well as a motion sensor included in the one or more candidate electronic devices.

According to an example, the information obtaining module 640 may be configured to determine a group including one or more candidate objects a target object, as well as determine each candidate object as a target object. The group may be determined based on at least one of, for example, a user's input, a region, in which the candidate object is displayed, and functions of the candidate electronic devices.

For example, based on a user's input (for example, a touch input), first to third candidate objects may be determined as a first group, and fourth and fifth candidate objects may be determined as a second group. For example, the first and second candidate objects located in the first region of the virtual environment may be determined as the first group, and the third to fifth candidate objects located in the second region of the virtual environment may be determined as the second group.

For example, one or more candidate objects corresponding to one or more candidate electronic devices, in which a relevant function is executed, may be determined as one group. For example, a monitor object corresponding to a monitor for outputting a video and a speaker object corresponding to a speaker for outputting a sound corresponding to the video may be determined as one group. Further, a game console object corresponding to a game console for controlling a game, a monitor object corresponding to a monitor for displaying an image of the game, and a speaker object corresponding to a speaker for outputting a sound for the game may be determined as one group.

According to an example, the information obtaining module 640 may be configured to obtain information to be output through the target electronic device corresponding to the target object. For example, a movie may be currently output through the target electronic device. The information obtaining module 640 may be configured to obtain information on at least a part (a next part of a part output by the target electronic device) of the currently output movie. For example, when a notification (for example, a notification for reception of a text message when the target electronic device is a smart phone) is output (or to be output) by the target electronic device, the information obtaining module 640 may receive information about the notification. For example, when a smart phone that is the target electronic device receives a text message, the smart phone may need to output at least one of a ring sound, a vibration, text message contents, and text message sender information corresponding to the reception of the text message. For example, the information obtaining module 640 may be configured to obtain at least one of information indicating that the text message is received, text message contents, and the text message sender information.

According to an example, the information obtaining module 640 may be configured to directly obtain information from the target electronic device through wireless or wired communication (for example, D2D communication). Further, according to another example, the information obtaining module 640 may be configured to obtain information about the target electronic device through another electronic device (for example, the electronic devices 102 and 104, and the server 106) connected with the target electronic device. For example, the information obtaining module 640 may obtain the information through a server managing the information to be output by the target electronic device.

The content providing module 650 may be configured to provide, for example, contents corresponding to the obtained information in relation to the region, on which the target object is displayed (for example, within the displayed region or a region closed to the displayed region). According to an example, the content providing module 650 may be configured to determine contents corresponding to the obtained information. For example, when the obtained information is information about a notification, the content providing module 650 may be configured to determine an image, a video, text, an icon, a sound, or a vibration related to the notification as the contents corresponding to the notification.

According to an example, the obtained information may be information about contents (for example, a video, an image, or text) output by the target electronic device. For example, the content providing module 650 may be configured to determine contents identical or similar to the contents output by the target electronic device or contents obtained by processing (for example, changing a format, resolution, or a size of data) at least a part of the contents output by the target electronic device as the contents corresponding to the information.

For example, the obtained information may be information about a second part, which is a next part of a first part of a movie currently output through the target electronic device. For example, the content providing module 650 may be configured to determine the second part of the movie as contents corresponding to the information. For example, a data format of the video that is the obtained information may be a first data format. For example, the content providing module 650 may be configured to determine the video, of which the data format is changed from the first data format to the second data format, as contents corresponding to the information.

According to an example, the content providing module 650 may be configured to provide the contents to the region, on which the target object is displayed, the region closed to (or connected with) the region, on which the target object is displayed, or a direction corresponding to the region, on which the target object is displayed. For example, when the target object is an image of a television, the content providing module 650 may be configured to display contents on a partial region (for example, an image part corresponding to a display of the television) included in the television image. For example, if the target object is an icon (for example, the washing machine icon 547) for the target electronic device, the content providing module 650 may be configured to display the contents (for example, the contents 597) on an upper, lower, left, or right region of the icon. For example, the content providing module 650 may be configured to display the contents together with visual information (for example, a connection line) connecting the target object and the contents. For example, the content providing module 650 may display the contents on a region different from that of the target region, and then move the contents to the region, on which the target object is displayed.

For example, the electronic device may include a first speaker located in a first direction (for example, a right side) of the display and a second speaker located in a second direction (for example, a left side) of the electronic device. A first target object may be displayed on a region corresponding to the first direction of the display. In this case, the content providing module 650 may be configured to output a louder sound through the first speaker than the second speaker so that the user recognizes as if the sound that is the content is output in the first direction corresponding to the first target object. Otherwise, the content providing module 650 may be configured to output the sound only through the first speaker.

A second target object may be displayed on a region corresponding to the second direction of the display. For example, the content providing module 650 may output a louder sound through the second speaker than the first speaker so that the user recognizes as if the sound that is the content is output in the second direction corresponding to the second target object. Otherwise, the content providing module 650 may output the sound only through the second speaker.

According to an example, the content providing module 650 may be configured to provide another information obtained through an electronic device different from the target electronic device in relation to the region, on which the target object corresponding to the target electronic device is displayed. For example, information (for example, writing contents for a lecture when the content is a video lecture) related to contents provided to the region, on which the target object corresponding to the target electronic device is displayed, may be obtained through an electronic device different from the target electronic device. For example, the content providing module 650 may be configured to provide the information to the region, on which the target object is displayed (or the region close to the region), in relation to the contents. A method of providing the obtained information through another electronic device will be described with reference to FIG. 10. According to an example, the content providing module 650 may be configured to control (for example, temporarily stop or turn off) the provision of the contents based on external environment information (for example, external object recognition) for the electronic device. For example, the content providing module 650 may be configured to check for, for example, a person located around the electronic device (for example, within about 1 m) as external environment information through the image sensor functionally connected with the electronic device while providing the contents. For example, the content providing module 650 may be configured to stop providing the contents so as to enable the user of the electronic device to recognize that a person is located in a neighboring region. Otherwise, the content providing module 650 may be configured to display information indicating that a person is located in a neighboring region. For example, the content providing module 650 may display an image (for example, a picture of the person) or text corresponding to the person.

The device control module 660 may be configured to control, for example, a function of the target electronic device corresponding to the target object. According to an example, the device control module 660 may be configured to control an output function of the target electronic device. For example, the contents corresponding to the output (for example, currently output) information through the target electronic device through the content providing module 650 may be output through the electronic device. Accordingly, the information may be provided through the target electronic device and the contents corresponding to the information may be simultaneously provided by the electronic device. It may be difficult for the user to simultaneously check the information output through the target electronic device and the contents provided by the electronic device.

Accordingly, when the user uses the electronic device, the device control module 660 may be configured to control the target electronic device so that the information is not output through the target electronic device. On the other hand, when the user does not use the electronic device, the device control module 660 may be configured to control the target electronic device so that the information is output through the target electronic device. Further, the device control module 660 may be configured to stop the output of the contents for the information by the electronic device.

For example, if the electronic device is a wearable electronic device, the device control module 660 may be configured to determine whether the electronic device is used based on the electronic device is worn by the user. For example, the contents may be provided by a television, which is the external electronic device of the electronic device. If the electronic device is an HMD, the device control module 660 may check whether the HMD is worn by the user.

If the HMD is worn by the user, the device control module 660 may be configured to control the television so that the contents are not provided through the television (turn off only a screen of the television) or turn off the television. Then, if the HMD is detached from the user, the device control module 660 may control the television or turn on the television so that the contents are output through the television again. The method of controlling the target electronic device will be described with reference to FIG. 8 below.

According to an example, the device control module 660 may also be configured to control (turn off) an operation of another external electronic device for the electronic device, as well as the target electronic device. For example, the device control module 660 may be configured to turn off a lighting located around the electronic device and at least some functions of the television (turn off only a screen output function of the television) when the electronic device is used by the user. On the other hand, the device control module 660 may be configured to turn on the lighting and the television again when the electronic device is not used by the user.

According to an example, the device control module 660 may be configured to provide a control menu for controlling the contents output through the target electronic device or the electronic device in relation to the target object. For example, when the target electronic device is the lighting, the device control module 660 may be configured to display control menu items corresponding to a function of "turning off" and "turning on" the lighting on a region, on which the lighting object is displayed. When the user selects the control menu item corresponding to "turning off", the device control module 660 may be configured to control the lighting so that the lighting is turned off. The method of providing the control menu item will be described with reference to FIG. 8 below.

According to an example, the device control module 660 may be configured to transmit at least some of the contents output through the target object or the information (for example, some contents or link information about the contents) related to the contents to an electronic device corresponding to another target object. Accordingly, at least some of the information may be provided through the electronic device corresponding to another target object. For example, the device control module 660 may be configured to select at least a part of an advertisement image that is the content provided through a region, on which a first target object is displayed.

According to an example, the device control module 660 may be configured to transmit link information related to an advertisement product corresponding to the advertisement image to a target electronic device corresponding to a second target object based on a user's input (for example, a drag from the first target object to the second target object or a movement of the gaze of the user from the first target object to the second target object) for a region, on which the second target object is displayed. The method of transmitting the contents or the information related to the contents will be described with reference to FIG. 9 below.

Figure 7:
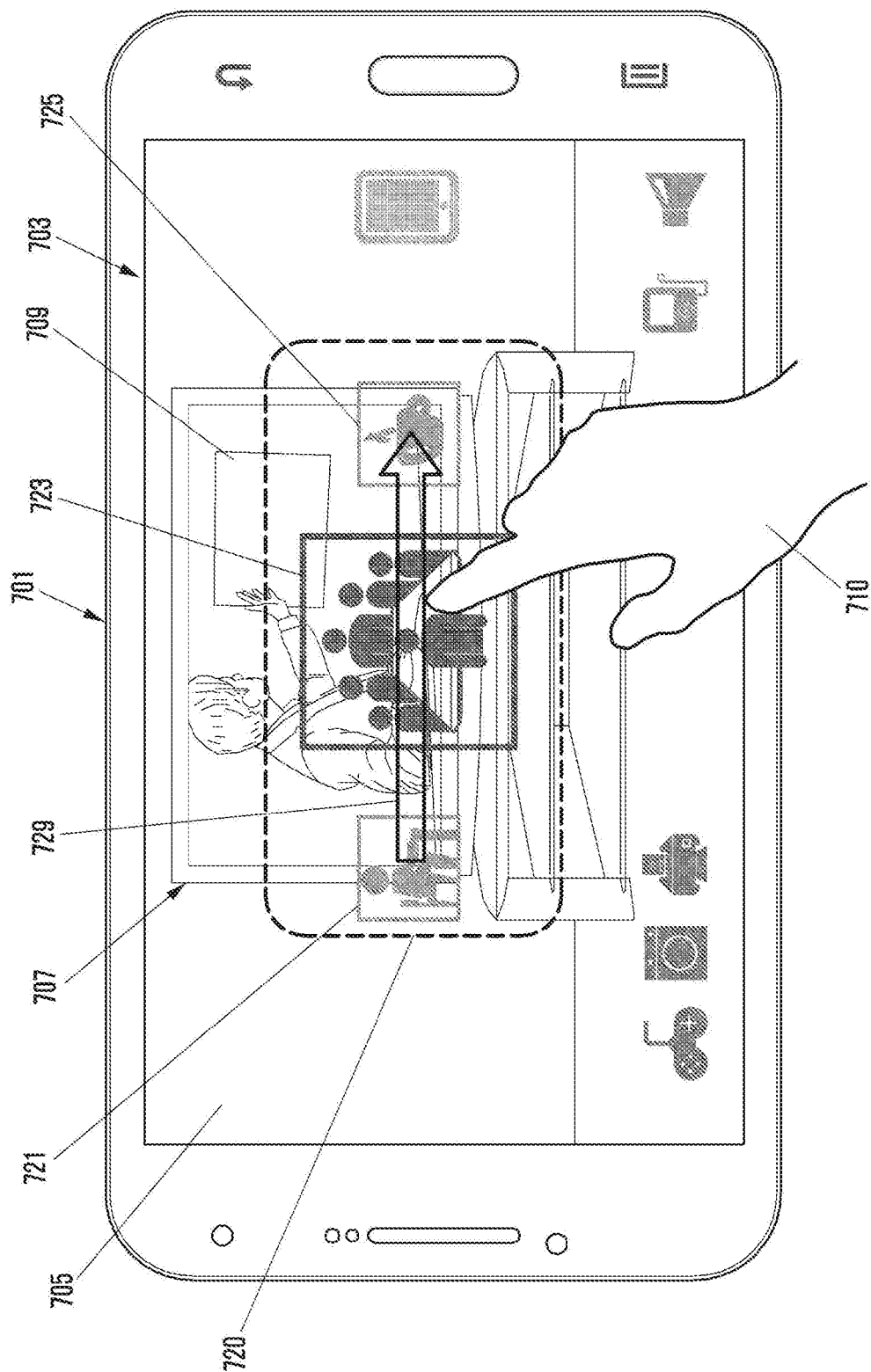
FIG. 7 illustrates an example of a user interface provided through an electronic device.

FIG. 7 illustrates an example of a user interface (for example, the virtual environment 500) provided through an electronic device (for example, the electronic device 101). Referring to FIG. 7, a background of a living room, in which a user 710 is located, may be displayed through a display 703 of an electronic device 701 as a background of a virtual environment 705 (for example, the virtual environment 500). According to an example, contents 709, which may be output through a television disposed in the living room, may be displayed through a television object 707 corresponding to the television. For example, the user 710 may watch the contents 709 through the television object 707 within the virtual environment 705 identically or similarly to the contents 709 provided by the actual television in the actual living room.

According to an example, a selection menu 720, through which the background of the virtual environment 705 may be changed, may be provided to the user 710 through the virtual environment 705. For example, when the television object 707 displayed within the virtual environment 705 is displayed with a first depth effect (or three-dimensional effect), the selection menu 720 may be displayed with a second depth effect. For example, the selection menu 720 having the second depth effect may be recognized to be closer to the user 710 than the television object 707 having the first depth effect. According to an example, the selection menu 720 may be more transparently displayed than other objects within the virtual environment 705.

The selection menu 720 may include, for example, a first menu item 721 having a background of a lecture room, a second menu item 723 having a background of a conference room, and a third menu item 725 having a background of a café, or other menu items (not shown). According to an example, the first menu item 721 to the third menu item 725 may be moved in a specific direction 729 (for example, a right direction) based on the gaze or a gesture of the user 710. For example, in FIG. 7, the first menu item 721, the second menu item 723, and the third menu item 725 are sequentially disposed in the right direction (for example, the specific direction 729) from a left side, but the third menu item 725, the first menu item 721, and the second menu item 723 may be sequentially disposed from the left side to the right side according to an input of the user 710.

According to an example, the second menu item 723 may be selected by the gaze or the gesture of the user 710. For example, the user 710 may select the second menu item 723 by viewing the second menu item 723 for a predetermined time, or by touching the second menu item 723. According to an example, the electronic device 701 may provide the user 710 with visual information notifying that the second menu item 723 is selected. For example, the electronic device 701 may display the second menu item 723 to be larger than the first menu item 721 or the third menu item

725, display the second menu item 723 to be stronger than the first menu item 721 or the third menu item 725, display the second menu item 723 to be flickered, or display the second menu item 723 with a shadow.

Figure 8:
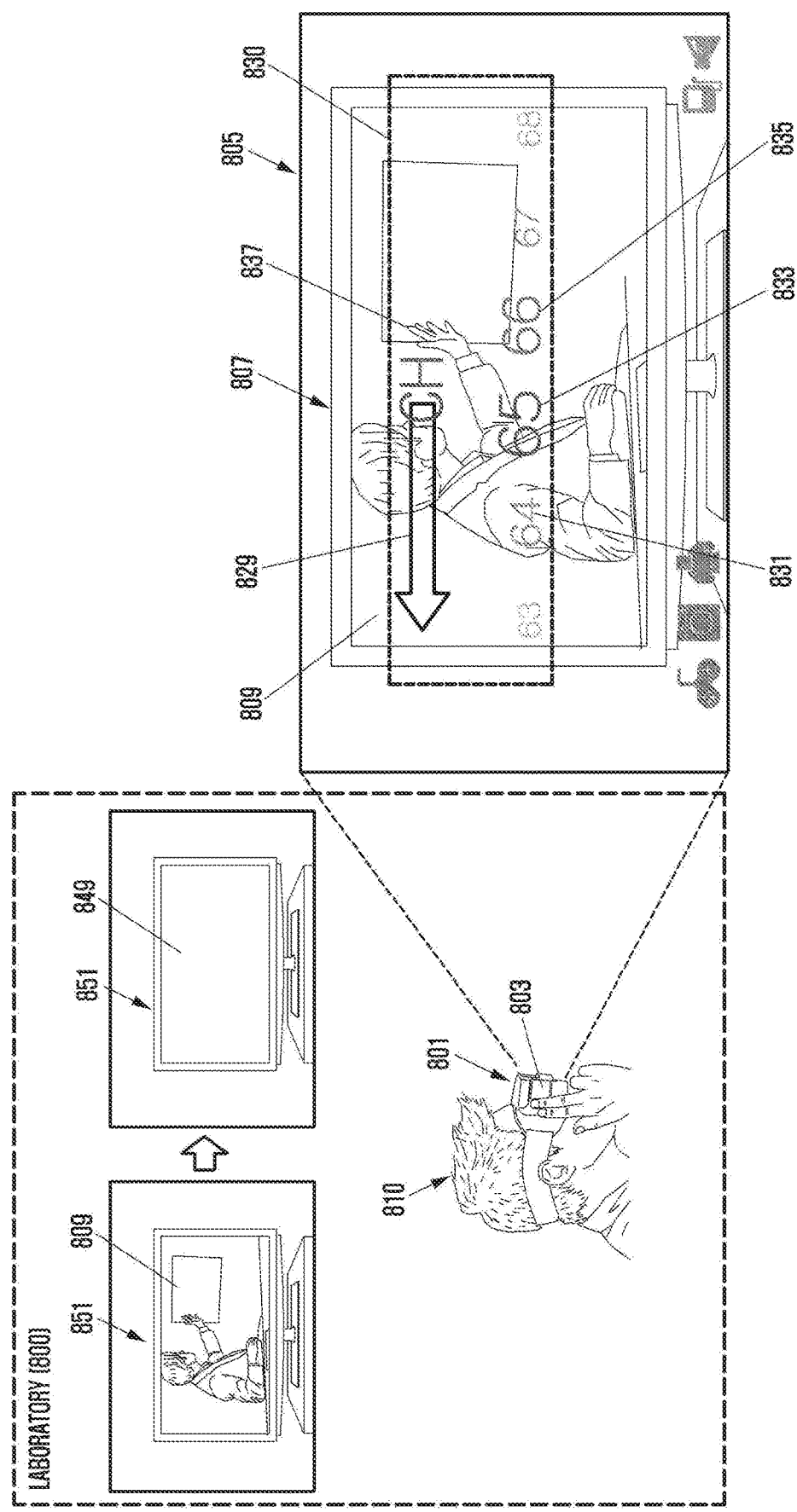
FIG. 8 illustrates an example of a user interface provided through the electronic device.

FIG. 8 illustrates an example of a user interface (for example, the virtual environment 500) provided through an electronic device (for example, the electronic device 101). Descriptions of parts identical or similar to those of FIG. 7 will be omitted, and reference numerals of parts identical or similar to those of FIG. 7 will be denoted with the identical or similar reference numerals.

Referring to FIG. 8, contents 809 (for example, the contents 709) providable through an actual television 851 disposed in a laboratory room 800, in which a user 810 is located, may be provided through a television object 807 (for example, the television object 707) in a virtual environment 805 (for example, the virtual environment 705). For example, if the user 810 wears an electronic device 801 (for example, the electronic device 701), the electronic device 801 may display the contents 809 within at least a partial region of the virtual environment 805 displayed through the electronic device 801.

According to an example, if the contents 809 (for example, broadcasting or Electronic Program Guide (EPG)) are displayed through the television object 807, the television 851 may continuously output the contents 809, but may also stop providing the contents 809 and provide a default image 849. The default image 849 may include, for example, an image (for example, black data) having the smaller amount of data than that of the contents 809 or the smaller amount of current consumed than that consumed if the contents 809 are output. For example, if the contents 809 are displayed through the television object 807, at least some functions (for example, only a screen output function of the television) of the television 851 may be turned off, and some other functions of the television 851 (an operation of waiting for reception of a signal provided by the electronic device 101) may be performed. According to an example, if the contents 809 are displayed through the television object 807, the television 851 may be turned off.

According to an example, a control menu 830, through which the television 851 may be controlled, may be provided to the user 810 through the virtual environment 805. For example, the control menu 830 may include a channel menu 837, through which a channel of the television 851 may be changed. Although not illustrated, the control menu 830 may include various menu items including volume, screen resolution, pause, play, fast forward, rewind, or fast play. For example, if the television object 807 displayed within the virtual environment 805 is displayed with a first depth effect (or three-dimensional effect), the selection menu 830 may be displayed with a second depth effect or more transparently than other objects.

The user 810 may select a channel of the television 851 through a hardware key 803 formed in the electronic device 801. Otherwise, the user 810 may select, for example, a channel of the television 851 by viewing or touching with a finger at least one of first to third channel information 831, 833, and 835 displayed within the virtual environment 805 for a predetermined time. According to an example, the first channel information 831 to the third channel information 835 may be moved in a specific direction 829 (for example, a left direction) based on the gaze or a gesture of the user 810.

According to an example, the sequentially disposed first to third channel information 831, 833, and 835 may be displayed with different sizes based on the selected second channel information 833. For example, the selected second channel information 833 may be displayed to be largest, and the non-selected first channel information 831 and third channel information 835 may be displayed to be relatively smaller than the second channel information 833. According to an example, other non-selected channel information may be displayed to be gradually smaller when being far from the selected second channel information 833.

Figure 9:
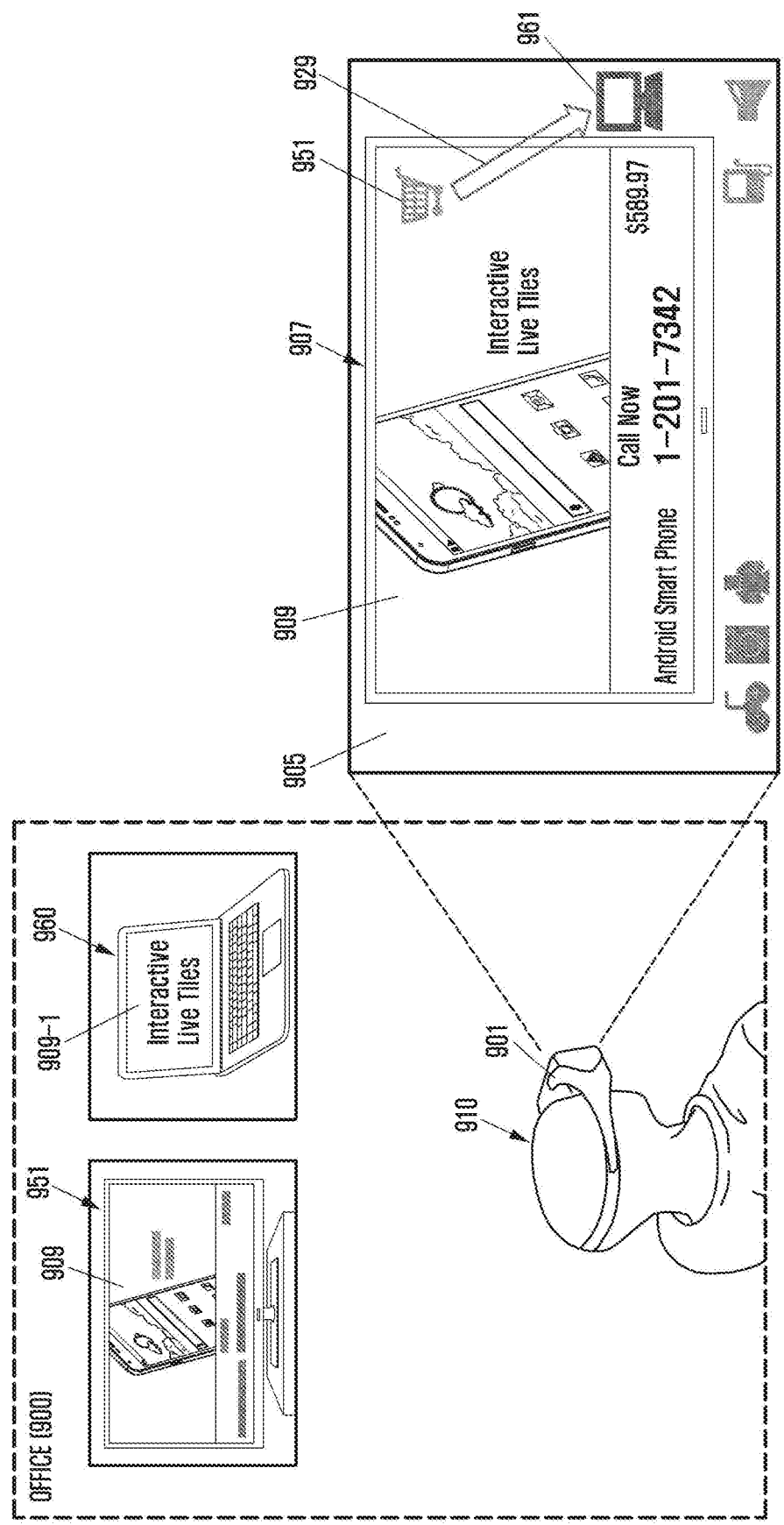
FIG. 9 illustrates an example of a user interface provided through the electronic device.

FIG. 9 illustrates an example of a user interface (for example, the virtual environment 500) provided through an electronic device (for example, the electronic device 101). Descriptions of parts identical or similar to those of FIG. 7 or 8 will be omitted, and reference numerals of parts identical or similar to those of FIG. 7 or 8 will be denoted with the identical or similar reference numerals.

Referring to FIG. 9, contents 909 (for example, the contents 709) providable through a monitor 951 or through a monitor object 907 corresponding to an actual monitor 951 may be provided in a virtual environment 905 (for example, the virtual environment 705) corresponding to an office 900. According to an example, an icon 951, through which information related to the contents 909 is transmittable to an actual notebook computer 960, may be displayed in the virtual environment 905.

The icon 951 may be displayed on, for example, at least a partial region of the monitor object 907, on which the contents 909 are displayed. According to an example, the icon 951 may be displayed in a form of an image or text representing a transportation means (for example, an automobile, a cart, a bicycle, a wagon, or a wheel). According to an example, if a user 910 touches the icon 951 or views the icon 951 for a predetermined time, the icon 951 may be activated. According to an example, if the icon 951 is activated, the icon 951 may be flickered, displayed thicker, displayed larger, or finely move. For example, if the icon 951 is shaped like a cart, the cart may roll wheels in place or while moving forward in a specific direction 929 (for example, a front direction).

According to an example, if the icon 951 is moved to a notebook computer object 961 corresponding to the notebook computer 960 based on the gaze or the gesture of the user 910, the information related to the contents 909 may be transmitted to the notebook computer 960. The information related to the contents 909 may include, for example, at least some contents of the contents 909 currently displayed through the monitor object 907, link information about the contents 909, and detailed information about an image, terms, or text included in the contents 909.

Figure 10:
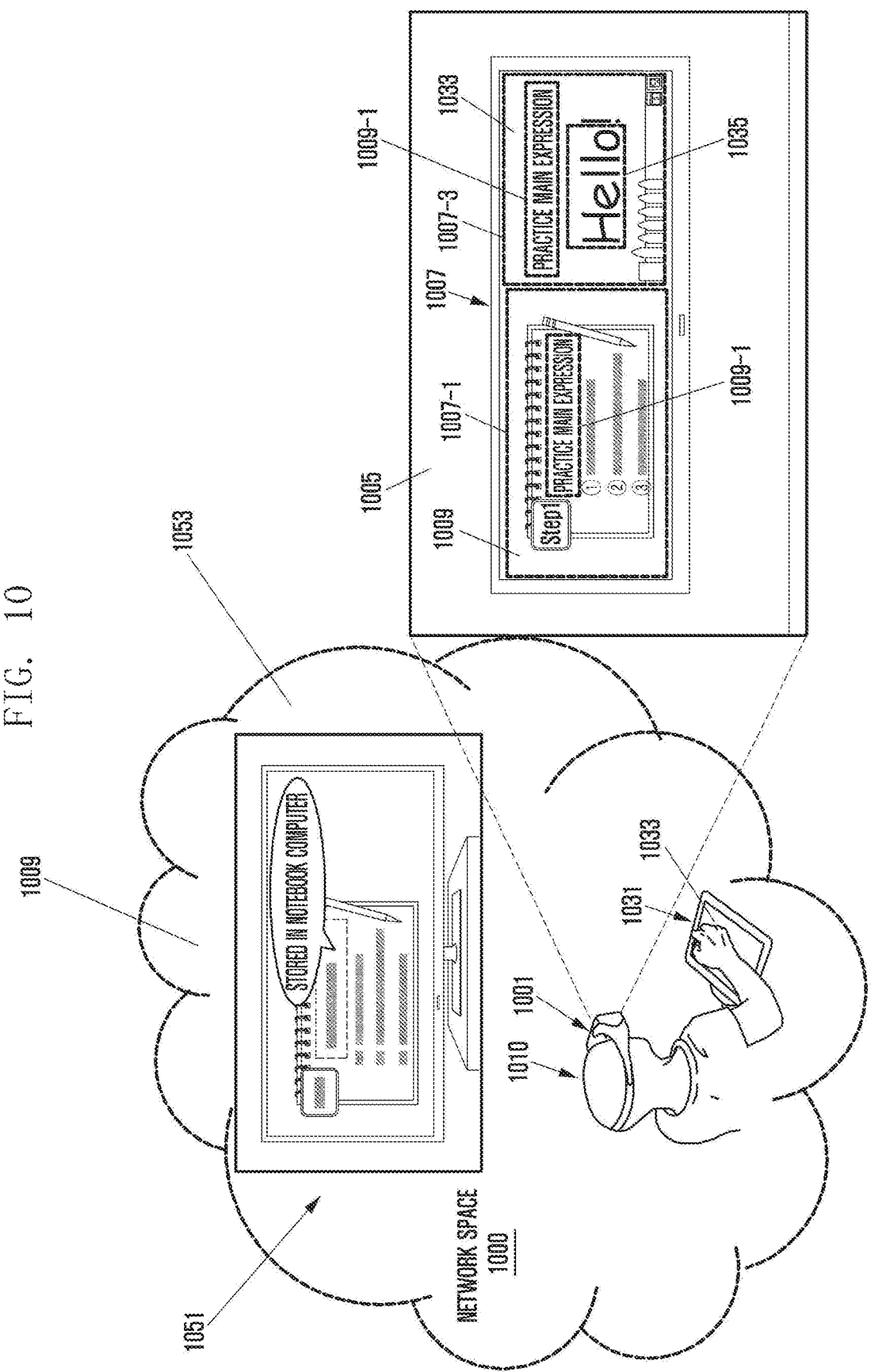
FIG. 10 illustrates an example of a user interface provided through the electronic device.

FIG. 10 illustrates an example of a user interface (for example, the virtual environment 500) provided through an electronic device (for example, the electronic device 101). Descriptions of parts identical or similar to those of FIGS. 7 to 9 will be omitted, and reference numerals of parts identical or similar to those of FIGS. 7 to 9 will be denoted with the identical or similar reference numerals.

Referring to FIG. 10, a user 101 may use a first electronic device 1001 (for example, the electronic device 101), a second electronic device 1031, and a third electronic device 1051 within a network space 1000. The network space 1000 represents, for example, an environment, in which a plurality of electronic devices are linked with each other by using wired or wireless communication to provide information to the user 1010 or obtain information from the user 1010.

According to an example, first contents 1009 (for example, education contents) outputtable through the third electronic device 1051 (for example, the monitor 951) may be provided through at least a partial region of the object 1007 (for example, the monitor object 907) disposed within the virtual environment 1005 displayed through a display of the first electronic device 1001. According to an example, the user 1010 may execute a memo application as second contents 1033 through the second electronic device 1031. For example, the second contents 1033 may be provided through the object 1007 together with the first contents 1009. For example, the first contents 1009 may be provided through a first region 1007-1 of the object 1007 (for example, a left portion of the object 1007), and the second contents 1033 may be provided through a second region 1007-3 of the object 1007 (for example, a right portion of the object 1007).

According to an example, if the user 1010 inputs specific contents through the memo application of the second electronic device 1031, the specific contents may be displayed through the object 1007. For example, if the second electronic device 1031 receives a phrase "Hello!" from the user 1010, the first electronic device 1001 may display the phrase "Hello!" 1035 on the second region 1007-3 of the object 1007, on which the second contents 1033 are displayed.

According to an example, if the user 1010 does not input an additional phrase for a predetermined time or inputs a command that a phrase input is completed, the first electronic device 1001 may simultaneously display the phrase 1035 on the object 1007. For example, the phrase "Hello!" 1035 may be simultaneously output through a display of the electronic device 1001 (for example, by using one frame provided for one vertical clock). According to various examples, in response to the input of the phrase of the user 1010, the first electronic device 1001 may instantly display the phrase 1035 through the display. For example, if the user 1010 inputs "H" into the second electronic device 1031, the first electronic device 1001 may output "H" through the display in response to the input of "H". Next, if the user 1010 sequentially inputs "e", "l", "l", "o", and "!", the first electronic device 1001 may sequentially display the respective characters through the display in response to the respective inputs.

According to an example, an actual use environment of an external electronic device 1031, on which the phrase 1035 is displayed, may correspond to the virtual environment 1005 displayed on the monitor object 1007. For example, if the phrase 1035 is displayed on a center region of the memo application, the phrase 1035 may be displayed on a center region of the second region 1007-3 of the monitor object 1007. If the phrase 1035 is input with a first size through the external electronic device 1031, the phrase 1035 may be displayed with a second size (for example, about two times of the first size) corresponding to a ratio of the first size on the monitor object 1007. For example, if the phrase 1035 is input larger through the external electronic device 1031, the phrase may be displayed larger on the second region 1007-3 of the monitor object 1007.

According to an example, the first electronic device 1001 may display at least some contents 1009-1 of the first contents 1009 output through the first region 1007-1 of the object 1007 on the second contents 1033 output through the second region 1007-3 of the object 1007 automatically or based on a user's input. For example, the first electronic device 1001 may automatically back up at least some contents 1009-1 in the second contents 1033 based on various cases, that is, a case where at least some contents 1009-1 include a specific term designated by the user 1010, importance of at least some contents 1009-1 is relatively higher than that of other contents, and at least some contents 1009-1 are not properly displayed through the object 1007.

According to an example, if at least some contents 1009-1 are displayed through the second region 1007-3 of the object 1007, on which the second contents 1003 are displayed, at least some contents 1009-1 may also be displayed on a display of the second electronic device 1031. According to an example, the first electronic device 1001 may transmit at least some contents 1009-1 to the second contents 1033, so that at least some contents 1009-1 may be displayed or stored through the second electronic device 1031.

According to an example, if at least some contents 1009-1 are displayed through the second contents 1033, the third electronic device 1051 may have additional information 1053 for at least some contents 1009-1. For example, the third electronic device 1051 may obtain information indicating that at least some contents 1009-1 are displayed or stored through the second electronic device 1031 as the additional information 1053 for at least some contents 1009-1 from the first electronic device 1001 or the second electronic device 1031.

According to an example, if the user 1010 selects at least some contents 1009-1 based on the gaze or a gesture of the user 1010, the third electronic device 1051 may display the additional information 1053 through a display of the third electronic device 1051.

As described above, within the network space 1000, information provided through at least one of the first electronic device 1001 to the third electronic device 1051 may be shared through another electronic device, and the information obtained through at least one of the first electronic device 1001 to the third electronic device 1051 also be displayed or stored through another electronic device.

Figure 11:
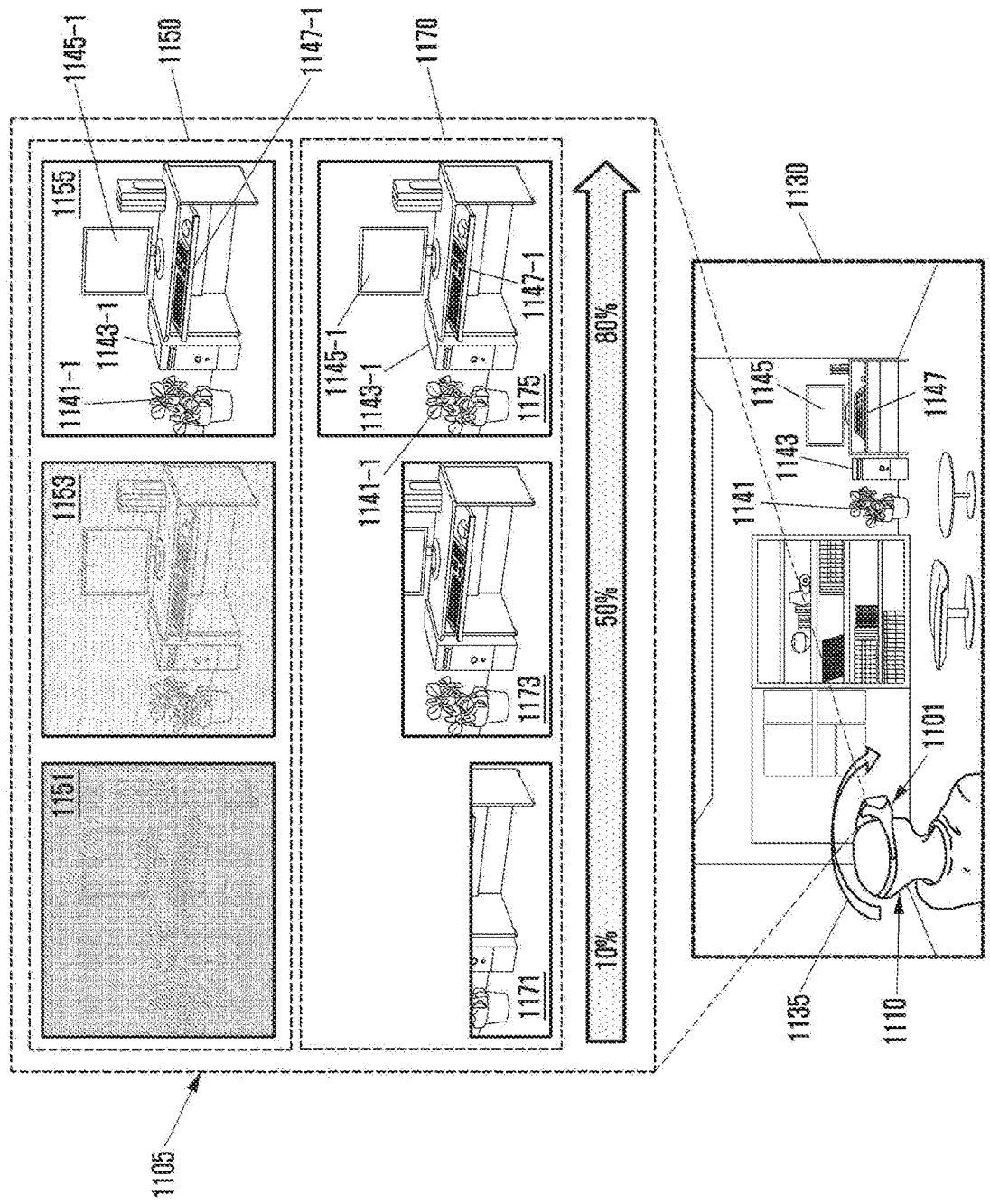
FIG. 11 illustrates an example of a user interface provided through the electronic device.

FIG. 11 illustrates an example of a user interface (for example, the virtual environment 500) provided through an electronic device (for example, the electronic device 101). Referring to FIG. 11, for example, in order to form a virtual environment 1105 corresponding to a living room 1130, a user 1110 may scan the living room 1130 in a predetermined direction 1135 (for example, from the left to the right) while wearing an electronic device 1101 (for example, the electronic device 101).

For example, an electronic flowerpot 1141, a desktop computer 1143, a monitor 1145, and a keyboard 1147 disposed in the living room 1130 may be discovered by the electronic device 1101, and displayed as first to fourth objects 1141-1, 1143-1, 1145-1, and 1147-1 at locations corresponding to actual spaces thereof, respectively, within the virtual environment 1105.

According to an example, the electronic device 1101 may differently display user interfaces 1150 and 1170 according to a processing degree of the virtual environment 1105 in generating the virtual environment 1105. The first user interface 1150 may, for example, vary a transparency of the virtual environment 1105 according to the processing degree. For example, if the processing degree is about 10%, transparency 1151 of the virtual environment 1105 may have a first transparency having the most unclear transparency. If the processing degree is about 50%, transparency 1153 of the virtual environment 1105 may have a second transparency having a middle transparency higher than the first transparency. If the processing degree is about 80%, transparency 1155 of the virtual environment 1105 may have third transparency having the highest transparency. According to an example, the transparency of the virtual environment 1105 provided by the first user interface 1150 may be gradually changed from about 0% to about 100% according to a processing degree.

The second user interface 1170 may, for example, vary a region of the virtual environment 1105 output through a display of the electronic device 1101 based on the processing degree. For example, if a processing degree is about 10%, a region 1171 of the virtual environment 1105 shown to the user 1110 may have a first region that is the narrowest region. If the processing degree is about 50%, the transparency 1173 of the virtual environment 1105 may have a second region having a middle region wider than the first region. If the processing degree is about 80%, transparency 1175 of the virtual environment 1105 may have a third region having the widest region. According to an example, the region of the virtual environment 1105 provided by the second user interface 1170 may be gradually changed from about 0% to about 100% based on a processing degree.

In FIG. 11, as an example, the processing degree of the virtual environment 1105 is represented by transparency or a shown region, but according to various examples, the processing degree of the virtual environment 1105 is variously represented by chroma, luminance, brightness, color, light and shade, shaking, movement, or the like.

According to various examples, an electronic device (for example, the electronic device 101) for sharing information through a virtual environment (for example, the virtual environment 500) may include a display (for example, the display 170) and an information providing module, e.g., in the form of processing circuitry, (for example, the information providing module 110) functionally connected with the display, and the information providing module may display an object corresponding to an external electronic device for the electronic device through the display, obtain information to be output through the external electronic device, and provide contents corresponding to the information in relation to a region, on which the object is displayed.

According to various examples, the information providing module may check a plurality of external electronic devices for the electronic device, and select the external electronic device among the plurality of external electronic devices based on a user's input or functions of the plurality of external electronic devices.

According to various examples, the information providing module may check a plurality of external electronic devices for the electronic device, and determine a currently operated electronic device among the plurality of external electronic devices as the external electronic device. According to various examples, at least one object may include at least one of an image for an appearance of the external electronic device, an icon corresponding to the external electronic device, and text corresponding to the external electronic device.

According to various examples, the information providing module may obtain a relative location of the external electronic device with respect to the electronic device, and if the relative location is a first location, the information providing module may display the object on a first region of the display, and if the relative location is a second location, the information providing module may display the object on a second region of the display.

According to various examples, the information providing module may check a time, for which the gaze of a user for the electronic device stays on the object, and if the time is a first time, the information providing module may display the object in a first format, and if the time is a second time, the information providing module may display the object in a second format.

According to various examples, the information providing module may provide the contents to at least a partial region of the region.

According to various examples, the contents include a sound, and the information providing module may check a location of the region in the display, and provides the sound in a first direction with respect to the electronic device if the location is a first location, and the information providing module may provide the sound in a second direction with respect to the electronic device if the location is a second location.

According to various examples, the information providing module may obtain another information obtained through another external electronic device for the electronic device, and further provide other contents corresponding to another information.

According to various examples, the information providing module may provide the contents if the electronic device is worn the user.

According to various examples, the contents may be provided to the user through at least one of the electronic device and the external electronic device.

According to various examples, the information providing module may control the external electronic device so that the contents are prevented from being provided through the external electronic device any longer if the electronic device is attached onto the user.

According to various examples, the information providing module may control the external electronic device so that the contents are provided to the user through the external electronic device based on the fact that the electronic device is detached from the user of the electronic device.

According to various examples, the information providing module may stop providing the contents based on external environment information about the electronic device.

According to various examples, an electronic device for sharing information through a virtual environment may include a display and an information providing module functionally connected with the electronic device, and the information providing module may display a plurality of objects corresponding to a plurality of external electronic devices, respectively, for the electronic device through the display, select at least one object among the plurality of objects, obtain information to be output by at least one external electronic device corresponding to at least one object among the plurality of external electronic devices, and provide the contents corresponding to the information in relation to a region, on which at least one object is displayed.

According to various examples, the information providing module may display a virtual environment through the display, and display the plurality of objects within the virtual environment.

According to various examples, the information providing module may change the virtual environment to another virtual environment based on at least one input for the electronic device.

According to various examples, at least one object may be displayed on a designated region of the virtual environment.

According to various examples, the contents may include first sub contents and second sub contents, and at least one object may include a first object for outputting the first sub contents and a second object for outputting the second sub contents.

According to various examples, the plurality of objects may include a first object and a second object, and the information providing module may output the first object based on a first frequency and the second object based on a second frequency.

According to various examples, the plurality of objects may include a first object and a second object, and the information providing module may obtain biometric information about a user of the electronic device, and the information providing module may determine the first object as at least one object if the biometric information corresponds to a first frequency, and determine the second object as at least one object if the biometric information corresponds to a second frequency.

According to various examples, the information providing module may determine at least one object based on at least one of the gaze and a gesture of the user for the electronic device.

According to various examples, the information providing module may provide a second part of output contents that is a next part of a first part of the contents previously output through at least one external electronic device as the information.

According to various examples, the information providing module may display a control menu for controlling the information in relation to at least one content through the region.

According to various examples, the information providing module may obtain an input for another object among the plurality of objects, and transmit at least a part of at least one content or at least a part of additional information about at least one content to another external electronic device so that at least the part of at least one contents or at least the part of the additional information on at least one contents is provided through another external electronic device corresponding to another object based on the input.

FIG. 12 is a flowchart 1200 illustrating an example method of providing information by an electronic device (for example, the electronic device 101). According to an example, in operation 1210, an electronic device (for example, the object display module 630) may display an object (for example, the television object 525) corresponding to an external electronic device (for example, the television 425) for the electronic device. According to an example, the electronic device may provide a virtual environment (for example, the virtual environment 500). For example, the electronic device may display the object within the virtual environment.

In operation 1230, the electronic device (for example, the information obtaining module 640) may obtain information (for example, the video 465) to be output through the external electronic device. According to an example, the electronic device may obtain the information if the external electronic device is selected as a target electronic device based on a user's input. In operation 1250, the electronic device (for example, the content providing module 650) may provide contents (for example, the video 465) corresponding to the information in relation to a region, on which the object is displayed.

According to various examples, a method of sharing information through a virtual environment by an electronic device (for example, the electronic device 101) may include an operation of displaying an object corresponding to an external electronic device for the electronic device through a display (for example, the display 170) functionally connected with the electronic device, an operation of obtaining information to be output through the external electronic device, and an operation of providing contents corresponding to the information in relation to a region, on which the object is displayed.

According to various examples, the operation of displaying the object may include an operation of checking a plurality of external electronic devices for the electronic device, and an operation of selecting the external electronic device among the plurality of external electronic devices based on a user's input or functions of the plurality of external electronic devices.

According to various examples, the operation of displaying the object may include an operation of checking a plurality of external electronic devices for the electronic device, and determining a currently operated electronic device among the plurality of external electronic devices as the external electronic device.

According to various examples, at least one object may include at least one of an image for an appearance of the external electronic device, an icon corresponding to the external electronic device, and text corresponding to the external electronic device.

According to various examples, the operation of displaying the object may include obtaining a relative location of the external electronic device with respect to the electronic device, an operation of displaying the object on a first region of the display if the relative location is a first location, and an operation of displaying the object on a second region of the display if the relative location is a second location.

According to various examples, the operation of displaying the object may include an operation of checking a time, for which the gaze of a user for the electronic device stays on the object, an operation of displaying the object in a first format if the time is a first time, and an operation of displaying the object in a second format if the time is a second time.

According to various examples, the operation of providing the contents may include an operation of providing the contents to at least a partial region of the region.

According to various examples, the contents include a sound, and the providing of the contents may include an operation of checking a location of the region in the display, an operation of providing the sound in a first direction with respect to the electronic device if the location is a first location, and an operation of providing the sound in a second direction with respect to the electronic device if the location is a second location.

According to various examples, the method of providing information through the virtual environment may further include an operation of obtaining another information obtained through another external electronic device for the electronic device, and an operation of providing other contents corresponding another information.

According to various examples, the providing of the contents may include an operation of providing the contents if the electronic device is worn by the user.

According to various examples, the contents may be provided to the user through at least one of the electronic device and the external electronic device.

According to various examples, the method of providing information through the virtual environment may further include an operation of controlling the external electronic device so that the contents are prevented from being provided through the external electronic device any longer if the electronic device is attached onto the user.

According to various examples, the operation of controlling the external electronic device may include an operation of controlling the external electronic device so that the contents are provided to the user through the external electronic device if the electronic device is detached from the user of the electronic device.

According to various examples, the method of providing information through the virtual environment may further include an operation of stopping providing the contents based on external environment information about the electronic device.

According to various examples, a method of providing information through a virtual environment may include an operation of displaying a plurality of objects corresponding to a plurality of external electronic devices, respectively, for the electronic device through a display functionally connected with the electronic device, an operation of selecting at least one object among the plurality of objects, an operation of obtaining information to be output by at least one external electronic device corresponding to at least one object among the plurality of external electronic device, and an operation of providing the contents corresponding to the information in relation to a region, on which at least one object is displayed.

According to various examples, the operation of displaying the plurality of objects may include an operation of displaying a virtual environment through the display, and an operation of displaying the plurality of objects within the virtual environment.

According to various examples, the method of providing information through the virtual environment may further include an operation of changing the virtual environment to another virtual environment based on at least one input for the electronic device.

According to various examples, at least one object may be displayed on a designated region of the virtual environment.

According to various examples, the contents may include first sub contents and second sub contents, and at least one object may include a first object for outputting the first sub contents and a second object for outputting the second sub contents.

According to various examples, the plurality of objects may include a first object and a second object, and the displaying of the plurality of objects may include an operation of outputting the first object based on a first frequency and an operation of outputting the second object based on a second frequency.

According to various examples, the plurality of objects may include a first object and a second object, and the operation of obtaining the information may include an operation of obtaining biometric information about a user of the electronic device, and an operation of determining the first object as at least one object if the biometric information corresponds to a first frequency, and an operation of determining the second object as at least one object if the biometric information corresponds to a second frequency.

According to various examples, the operation of obtaining the information may include an operation of determining at least one object based on at least one of the gaze and a gesture of the user for the electronic device.

According to various examples, the operation of providing the contents may include an operation of providing a second part of output contents that is a next part of a first part of the contents previously output through at least one external electronic device as the information.

According to various examples, the operation of providing the contents may include an operation of displaying a control menu for controlling the information in relation to at least one contents through the region.

According to various examples, the method of providing information through the virtual environment may further include an operation of obtaining an input for another object among the plurality of objects, and an operation of transmitting at least a part of at least one content or at least a part of additional information about at least one content to another external electronic device so that at least the part of at least one contents or at least the part of the additional information on at least one contents is provided through another external electronic device corresponding to another object based on the input.

According to various examples, in a storage medium storing commands, the commands may be set to make one or more processors perform one or more operations if the commands are executed by the one or more processors, and the one or more operations may include an operation of displaying, by an electronic device (for example, the electronic device 101) through a display (for example, the display 170) functionally connected with the electronic device, an operation of obtaining information to be output through at least one external electronic device, and an operation of providing contents corresponding to the information, respectively, through a region, on which at least one object is displayed.

The examples of the disclosure disclosed herein and drawings suggest the examples for plainly explaining the contents of the technology of the disclosure and helping the understanding of the disclosure, and do not limit the scope of the disclosure. Therefore, in addition to the examples disclosed herein, the scope of the various embodiments of the disclosure should be construed to include all modifications or modified forms drawn based on the technical idea of the various embodiments of the disclosure.

What is claimed is:
1. A head mounted device (HMD), comprising:
a display;
a motion sensor;
a communication circuit; and
at least one processor, coupled with the display, the motion sensor, and the communication circuit, configured to control the HMD to:
  display, on the display, a virtual environment, the virtual environment including an object corresponding to a first external electronic device in an actual environment;
  identify a relative location, in the virtual environment, of the object with respect to the HMD;
  detect, via the motion sensor, a motion of the HMD corresponding to a movement of a head of a user;
  based on the detected motion of the HMD corresponding to the object displayed in the virtual environment, receive, via the communication circuit, from the first external electronic device, first data that corresponds to first information comprising at least one of an image, a sound, text, or a vibration currently output at least one of visually, aurally, or tactilely by the first electronic device in the actual environment;
  output at least one of visually, aurally, or tactilely, in the virtual environment, content based on the received first data, the content being output in association with a region in the virtual environment at which the object is displayed,
  wherein the region is identified based on the relative location, in the virtual environment, of the object with respect to the HMD, and wherein the content in the virtual environment includes the same first information currently being output by the first external electronic device in the actual environment.

2. The HMD of claim 1, wherein the processor is further configured to control the HMD to recognize a plurality of external electronic devices, and select an external electronic device from among the plurality of recognized external electronic devices as the first external electronic device.

3. The HMD of claim 1, wherein the processor is further configured to control the HMD to recognize a plurality of external electronic devices, and identify a currently operated external electronic device among the plurality of recognized external electronic devices as the first external electronic device.

4. The HMD of claim 1, wherein the object includes at least one of an image corresponding to an appearance of the first external electronic device, an icon representing the first external electronic device, and text corresponding to the first external electronic device.

5. The HMD of claim 1, wherein the processor is further configured to control the HMD to display the object in a first region of the virtual environment based on the relative location being a first location, and to display the object in a second region of the virtual environment based on the relative location being a second location.

6. The HMD of claim 1, wherein the processor is further configured to control the HMD to identify a time period, for which the motion of the HMD remains on the object displayed in the virtual environment, and display the object in the virtual environment in a first display format based on the determined time period being a first time period, and display the object in the virtual environment in a second display format based on the determined time period being a second time period.

7. The HMD of claim 1, wherein the processor is further configured to control the HMD to output the content to at least part of the region in the virtual environment, and stop outputting the content in the virtual environment based on external environment information about the HMD.

8. The HMD of claim 1, wherein the first external electronic device includes a speaker and the content includes sound, and
the processor is further configured to control the HMD to identify a location of the region in the display of the virtual environment, and provide the sound in a first direction with respect to the HMD based on the location being a first location in the virtual environment, and provide the sound in a second direction with respect to the HMD based on the location being a second location in the virtual environment.

9. The HMD of claim 1, wherein the processor is configured to control the HMD to receive, via the communication circuit, second data that corresponds to second information output by a second external electronic device in the actual environment, and output, in the virtual environment, other content corresponding to the received second data.

10. The HMD of claim 1, wherein the processor is configured to control the HMD to output the content in the virtual environment based on the HMD being worn.

11. A method of sharing information by a head mounted device (HMD), the method comprising:
displaying, on a display, a virtual environment, the virtual environment including an object corresponding to a first external electronic device in an actual environment;
identifying a relative location, in the virtual environment, of the object with respect to the HMD;
detecting, via a motion sensor, a motion of the HMD corresponding to a movement of a head of a user;
based on the detected motion of the HMD corresponding to the object displayed in the virtual environment, receiving, by a communication circuit of the HMD, from the first external electronic device, first data that corresponds to first information comprising at least one of an image, a sound, text, or a vibration currently output at least one of visually, aurally, or tactilely by the first external electronic device in the actual environment; and
outputting at least one of visually, aurally, or tactilely, in the virtual environment, content based on the received first data, the content being output in association with a region in the virtual environment at which the object is displayed,
wherein the region is identified based on the relative location in the virtual environment of the object with respect to the HMD, and
wherein the content in the virtual environment includes the same first information currently being output by the first external electronic device in the actual environment.

12. The method of claim 11, further comprising:
recognizing a plurality of external electronic devices, and selecting an external electronic device from among the plurality of recognized external electronic devices as the first external electronic device.

13. The method of claim 11, further comprising:
recognizing a plurality of external electronic devices, and identifying a currently operated external electronic device among the plurality of recognized external electronic devices as the first external electronic device.

14. The method of claim 11, wherein the object includes at least one of an image corresponding to an appearance of the first external electronic device, an icon representing the first external electronic device, and text corresponding to the first external electronic device.

15. The method of claim 11, further comprising:
displaying the object in a first region of the virtual environment based on the relative location being a first location; and
displaying the object in a second region of the virtual environment based on the relative location being a second location.

16. The method of claim 11, further comprising:
identifying a time period, for which the motion of the HMD remains on the object displayed in the virtual environment;
displaying the object in the virtual environment in a first display format based on the determined time period being a first time period; and
displaying the object in the virtual environment in a second display format based on the determined time period being a second time period.

17. The method of claim 11, further comprising:
outputting the content to at least part of the region in the virtual environment.

18. The method of claim 11, wherein the first external electronic device includes a speaker and the content includes sound, and
the method further comprises:
identifying a location of the region in the display of the virtual environment;

providing the sound in a first direction with respect to the HMD based on the location being a first location in the virtual environment; and providing the sound in a second direction with respect to the HMD based on the location being a second location in the virtual environment.

19. The method of claim 11, further comprising:

receiving, via the communication circuit, second data that corresponds to second information output by a second external electronic device in the actual environment, and outputting, in the virtual environment, other content corresponding to the received second data.

20. The method of claim 11, further comprising:

outputting the content in the virtual environment based on the HMD being worn.

* * * * *